United States Patent [19]

Ito

[11] Patent Number: 5,579,159
[45] Date of Patent: Nov. 26, 1996

[54] OPTICAL MULTILAYER THIN FILM AND BEAM SPLITTER

[75] Inventor: Taku Ito, Tokyo, Japan

[73] Assignee: Asahi Kogaku Kogyo Kabushiki Kaisha, Tokyo, Japan

[21] Appl. No.: 355,200

[22] Filed: Dec. 8, 1994

Related U.S. Application Data

[62] Division of Ser. No. 18,383, Feb. 17, 1993, Pat. No. 5,400,179.

[30] Foreign Application Priority Data

Feb. 18, 1992 [JP] Japan .................................. 4-068985
Feb. 18, 1992 [JP] Japan .................................. 4-068986

[51] Int. Cl.$^6$ .................................. G02B 5/30; G02B 1/10
[52] U.S. Cl. .................. 359/487; 359/498; 359/496; 359/583; 359/586; 359/588
[58] Field of Search .................................. 359/483, 487, 359/485, 497, 498, 499, 583, 588, 586, 584

[56] References Cited

U.S. PATENT DOCUMENTS

| | | | |
|---|---|---|---|
| 2,403,731 | 7/1946 | MacNeille | 359/487 |
| 2,409,407 | 10/1946 | Turner | 359/584 |
| 3,559,090 | 1/1971 | Refermat et al. | 359/583 |
| 3,741,625 | 6/1973 | Saleh | 359/583 |
| 3,914,023 | 10/1975 | Thelen | 359/588 |
| 4,373,782 | 2/1983 | Thelen | 359/583 |
| 4,515,441 | 5/1985 | Wentz | 359/488 |
| 4,531,054 | 7/1985 | Suzuki | 250/201 |
| 4,609,258 | 9/1986 | Adachi et al. | 359/488 |
| 4,662,722 | 5/1987 | Buczek et al. | 359/584 |
| 4,746,202 | 5/1988 | Perilloux et al. | 359/584 |
| 4,966,438 | 10/1990 | Mouchart et al. | 359/586 |
| 5,103,337 | 4/1992 | Shrenk et al. | 359/359 |
| 5,223,983 | 6/1993 | Oono et al. | 359/834 |
| 5,247,508 | 9/1993 | Tanaka | 359/112 |
| 5,339,441 | 8/1994 | Kardos et al. | 359/359 |
| 5,377,040 | 12/1994 | Naganuma | 359/495 |

FOREIGN PATENT DOCUMENTS

| | | | |
|---|---|---|---|
| 2939204 | 4/1980 | Germany | 359/359 |
| 45061 | 3/1980 | Japan | 359/359 |
| 1092702 | 4/1989 | Japan | 359/586 |
| 0241502 | 9/1989 | Japan | 359/496 |
| 001727095 | 4/1992 | U.S.S.R. | 359/583 |
| 001727096 | 4/1992 | U.S.S.R. | 359/583 |

OTHER PUBLICATIONS

"Optical Thin Film" published by The Nikkan Kogyo Shinbun Ltd., on Nov. 30, 1989 and English translation, §§ 8.4 and 8.6.

H. A. MacLeod, "Thin–Film Optical Filters", printed in 1969, with attention given to pp. 301–304.

Dr. Hugo Anders, "Thin Film in Optics", printed in 1967, with attention given to pp. 97–98.

A. Thelen, "Avoidance or Enchancement of Polarization in Multilayers", Journal Optical Society of America, vol. 70, No. 1, Jan. 1980, pp. 118–121.

A. Thelen, "Non–Polarizing Inteference Films Inside a Glass Cube", Applied Optics, vol. 15, No. 12, Dec. 1976, pp. 2983–2985.

*Primary Examiner*—Paul M. Dzierzynski
*Assistant Examiner*—John Juba, Jr.
*Attorney, Agent, or Firm*—Greenblum & Bernstein P.L.C.

[57] ABSTRACT

A beam splitter having an optical multilayer thin film is disclosed. The optical multilayer thin film is formed by laminating six layers in sequence. The laminated six layers comprise: a first layer, a third layer and a fifth layer each having a refractive index from 1.63 to 1.64; a second layer and a sixth layer each having a refractive index from 1.37 to 1.38, a fourth layer having a refractive index from 1.9 to 2.3; in which light is allowed to be incident upon the first layer of the optical multilayer thin film at the angle of incidence equal to or greater than 40°. The reflectances of S and P polarized components of reflected light are substantially equal to each other over a wide wavelength range and substantially no phase difference exists between the S and P polarized components. The beam splitter having a multilayer polarizing light separating film formed between an incoming side prism and an outgoing side prism is extremely high in the reflectance of the P polarized component of reflected light, in comparison with that of the S polarized component of the same reflected light.

8 Claims, 14 Drawing Sheets

OPTICAL MULTILAYER THIN FILM AND BEAM SPLITTER

This application is a division, of application Ser. No. 08/018,383, filed Feb. 17, 1993, now U.S. Pat. No. 5,400,179.

BACKGROUND OF THE INVENTION

1. Field of the Invention

The present invention relates to an optical multilayer thin film, and a beam splitter formed with the thin film and suitable for use in various optical apparatuses such as optical measuring instruments, office automation apparatuses, laser application apparatuses, electron image processing apparatuses, optical communication apparatuses, optical information processing apparatuses, optical manufacturing apparatuses, etc.

2. Description of the Prior Art

In laser application apparatuses such as a laser beam printer, optical disc apparatus, laser processing apparatus, measuring instrument, etc., beam splitters are widely used to split a single optical beam into two paths. The beam splitter is formed by interposing an optical multilayer film between two sloping surfaces of two prisms. The optical multilayer film is formed by laminating a plurality of thin films of inorganic substances such as $TiO_2$, $SiO_2$, and $MgF_2$ on the surface of an optical part such as a prism or the like in accordance with a vacuum deposition technique, for instance.

One of the important performance requirments for the beam splitter described above is that there is no difference in phase between S and P polarized components of reflected and transmitted light in the beam splitter (hereinafter, referred to as "no phase difference"). In other words, linear polarized light can be obtained. Here, S is an abbreviation of "senkrecht (German, meaning perpendicular)", and an S polarized component means a polarized component of reflected and transmitted light having vibrations perpendicular to the plane of incidence of the light. Further, P is an abbreviation of "parallel (German, meaning parallel)", and a P polarized component means a polarized component of reflected and transmitted light having vibrations parallel to the plane of incidence of the light. In other words, an S polarized component means a component of light which is perpendicularly polarized with respect to the plane of incidence, and a P polarized component means a component of light which is polarized in a direction parallel with respect to the plane of incidence.

The reason why no phase difference is required is as follows. Namely, if there is a difference in phase between the S and P polarized components of reflected light, the spot diameter of a laser beam cannot be minimized, thus resulting in a problem in that the S/N (i.e., signal-to-noise) ratio is unavoidably reduced.

A beam splitter having no phase difference can be realized or achieved dependent upon the design of the optical multilayer film to be interposed between the two prisms. In the conventional optical multilayer thin films having no phase difference, there is a tendency in characteristics such that the S polarized component of reflected light is significantly larger than the P polarized component of the same reflected light.

Accordingly, it has been impossible for the conventional beam splitter, which uses the optical multilayer thin film to satisfy a requirement that the S and P polarized components of reflected light must be substantially equal to each other. Such a requirement exists, for example, when an optical path is designed so as to be used in common for both an MO (magnetooptic) element and a servo element in an photomagnetic disk reading apparatus. Therefore, when an optical system including such a beam splitter is designed, there is a problem in that the positional relationship among the elements such as the MO element and the servo element or the like arranged in the system is restricted from the design standpoint, so that the design flexibility is reduced. In addition, in the conventional beam splitter, since the reflectances of the S and P polarized components of reflected light is dependent upon the wavelength, it has been impossible to make constant the reflectances of the two components in a wide wavelength range.

Further, in designing an optical system, there is a case where the reflectance and transmittance of a beam splitter are required to be modified. With respect to this requirement, however, the optical multilayer film designed so as to have no phase difference is provided with an inherent reflectance (or transmittance). Therefore, when the reflectance is required to be modified without deteriorating the no phase difference performance, the optical multilayer film itself must be designed in a different way, because it is insufficient to change only the prism characteristics.

Further, in the optical system design, it is possible to increase the design flexibility, if the angle of incidence of a light beam upon the beam splitter can be modified. In the prior art beam splitter, however, there is a problem that once the angle of incidence of a light beam upon the beam splitter is changed, it has been impossible to maintain the no phase difference conditions due to the characteristics of the optical multilayer film.

As described above, in the prior art beam splitter, it has been difficult to change the various conditions such as the fractions of the reflectance of the S and P polarized components of reflected light, the refractive index, the angle of incidence, etc., while maintaining the no phase difference conditions, thus raising a problem in that the flexibility of optical system design is extremely restricted.

On the other hand, another performance requirement of the beam splitter as described above is to obtain a high resolving power for both the S and P polarized components of reflected light. In a beam splitter satisfying the above-mentioned requirements, there is provided a multilayer polarizing light separating film which is one of optical multilayer films.

For instance, such a multilayer polarizing light separating film is formed on the polarizing beam splitter used in the photomagnetic disk. In the prior art polarizing beam splitter, however, only the S polarized component of the reflected light reflected from an optical disk is separatable.

Accordingly, there is a problem in that the various optical elements for composing an optical system (i.e. an optical disk, polarized light beam splitter, separated polarized component detecting device, etc.) are unavoidably arranged at fixed positions, thereby reducing the design flexibility of the optical system.

SUMMARY OF THE INVENTION

With these problems in mind, therefore, it is the primary object of the present invention to provide an optical multilayer thin film and a beam splitter using the optical multilayer thin film, in which the reflectances of S and P polarized components of reflected light are substantially equal to each other in a wide wavelength range. Further various optical conditions such as reflectance and the angle of incidence can be modified while maintaining a no phase difference condition.

Further, another object of the present invention is to provide a beam splitter having a high reflectance for the P polarized component of reflected light in comparison with the S polarized component of the same reflected light, so that the flexibility of the optical system design can be increased.

In order to achieve the above-mentioned object, the optical multilayer thin film according to the present invention comprises a plurality of layers which include at least three layers each having a refractive index in a first range, at least two layers each having a refractive index in a second range, and at least one layer having a refractive index in a third range, wherein the refractive indices of the first, second and third ranges are different from each other. The optical multilayer thin film further comprises a device for reflecting light incident on the film at an angle equal to or greater than 40°, such that the reflectances of S and P polarized components of the reflected light are substantially close to each other over a predetermined wavelength and no phase difference exists between the S and P polarized components.

Preferably, the plurality of layers comprise six layers which are laminated in sequence. Further, the reflecting device comprises an arrangement of the laminated six layers, in which the laminated six layers includes: a first layer, a third layer and a fifth layer each having the refractive index in the first range; a second layer and a sixth layer each having the refractive index in the second range; and a fourth layer having the refractive index in the third range. More preferably, the refractive index of the first range is from 1.63 to 1.64; the refractive index of the second range is from 1.37 to 1.38; and the refractive index of the third range is from 1.9 to 2.3.

Further, the beam splitter according to the present invention includes an incoming side prism having a refractive index from 1.45 to 1.95, an outgoing side prism having a refractive index from 1.5 to 1.55, and the optical multilayer thin film described above. The optical multilayer thin film is interposed between the incoming and outgoing side prisms by arranging the first layer on the incoming side prism.

In the beam splitter formed by the combination of the incoming and outgoing side prisms and the optical multilayer thin film as described above, the reflectances of the S and P polarized components are substantially equal to each other or are extremely close to each other over a wide wavelength range.

The respective layers from the first to sixth layers are preferably formed of materials each having a characteristic which does not substantially absorb light. Further, it is preferable that the incoming and outgoing side prisms are also formed of materials each having a characteristic which does not substantially absorb light.

Further, in order to achieve the other object, a beam splitter according to the present invention includes a multilayer polarizing light separating film provided between an incoming side prism and an outgoing side prism. The multilayer polarizing light separating film comprises: a first layer formed on the incoming side prism; and a plurality of lamination layers each composed of at least four sublayers. Further, in addition to the above, it is possible to further provide a, b, c, and d layers which are formed in sequence beginning from the side of the lamination layers and between the lamination layers and the outgoing side prism. Preferably, in this multilayer polarizing light separating film, a refractive index of the incoming side prism is from 1.89 to 1.91; a refractive index of the outgoing side prism is from 1.50 to 1.55; a refractive index of the first layer is from 2.0 to 2.1; a refractive index of the first sublayer of the lamination layer which is located at the side of the first layer is from 1.63 to 1.68, a reflective index of the second sublayer is from 1.37 to 1.38, a reflective index of the third sublayer is from 1.44 to 1.48, and a refractive index of the fourth sublayer is from 2.2 to 2.4, respectively. A refractive index of each of the a and d layers is from 1.63 to 1.68, respectively, a refractive index of the b layer is from 1.37 to 1.38, and a refractive index of the c layer is from 1.44 to 1.48.

In the beam splitter according to the present invention formed as described above, since the reflectance of the P polarized component of reflected light is extremely increased in comparison with that of the S polarized component of the same reflected light, it becomes possible to design an optical system mainly dependent upon the P polarized component, thus improving the design flexibility of the optical system.

Other objects, constructions and advantages of the present invention will be apparent from the following description taken in conjunction with the drawings.

DETAILED DESCRIPTION OF THE PREFERRED EMBODIMENTS

The preferred examples of the optical multilayer thin film and the beam splitter according to the present invention will be described in detail hereinbelow with reference to the attached drawings.

Figure 1:
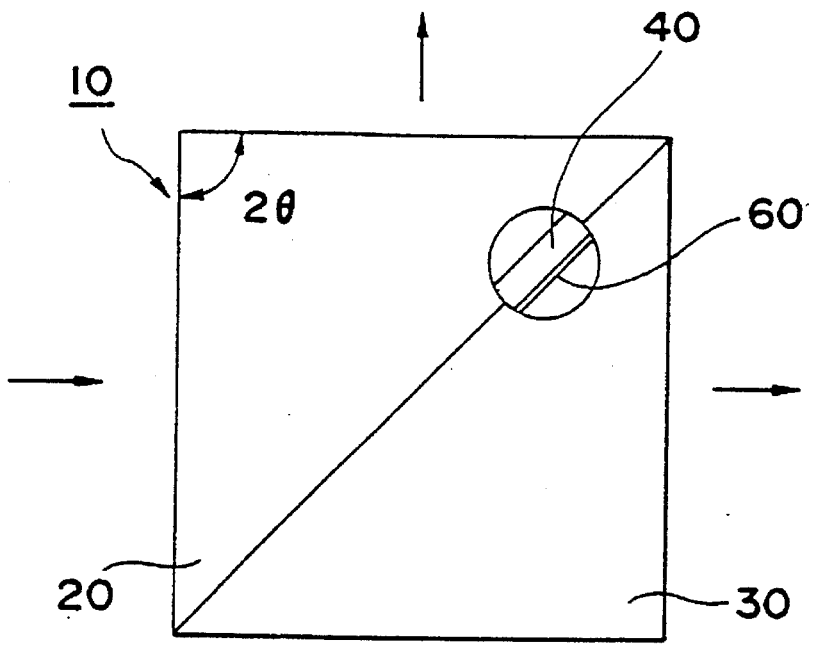
FIG. 1 is a side view of a beam splitter according to the present invention.
Figure 2:
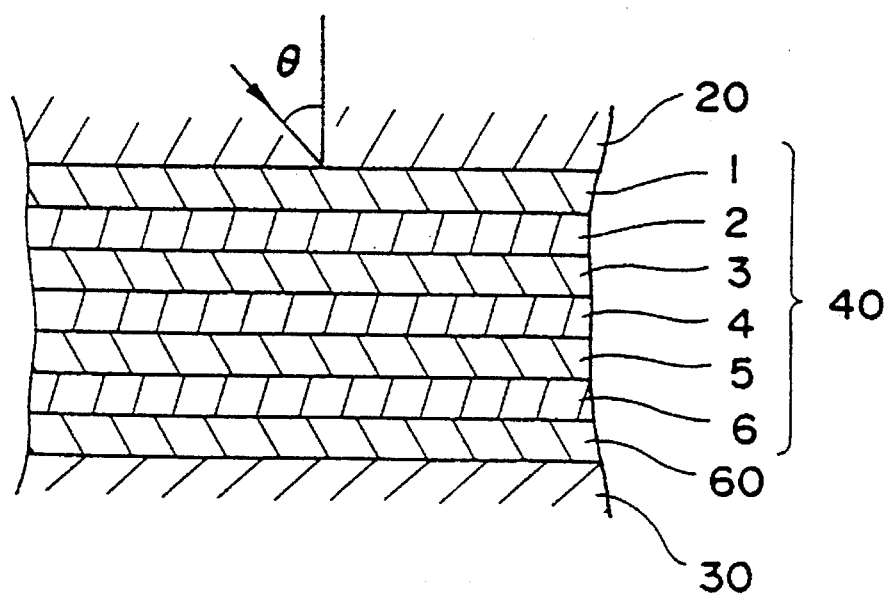
FIG. 2 is an enlarged cross-sectional view showing a layer structure of a optical multilayer thin film used in the beam splitter.

FIG. 1 shows a side view of a beam splitter 10 provided with an optical multilayer thin film 40 according to the present invention. Further, FIG. 2 is an enlarged cross-sectional side view showing the formation of the optical multilayer thin film 40 of the present invention. As shown, the optical multilayer thin film 40 is formed on the sloping surface of an incoming side prism 20.

The optical multilayer thin film 40 is composed of six layers in total, which comprise a first layer 1, a second layer 2, a third layer 3, a fourth layer 4, a fifth layer 5, and a sixth layer 6, beginning from the side of the incoming side prism 20.

The refractive indices of the respective layers are preferably as follows: The refractive indices of the first layer 1, the third layer 3 and the fifth layers 5 are about from (or between) 1.63 to 1.64, respectively; the refractive indices of the second layer 2 and the sixth layer 6 are about from 1.37 to 1.38, respectively; and the refractive index of the fourth layer 4 is about from 1.90 to 2.30, where these refractive indices were measured at the wavelength of 780 nm.

The materials of which the respective layers of the optical multilayer thin film 40 are composed can be given as follows:

The material having the refractive index from 1.9 to 2.3 is for instance titanium oxide as $TiO_2$, cerium oxide as $CeO_2$, zirconium oxide as $ZrO_2$, neodymium oxide as $Nd_2O_3$, tantalum oxide as $TaO_2$ or $Ta_2O_5$, praseodymium oxide as $Pr_6O_{11}$, indium oxide as $In_2O_3$, antimony oxide as $Sb_2O_3$, ytterbium oxide as $Yb_2O_3$, a mixture of cerium oxide as $CeO_2$ and yttrium oxide as $Yb_2O_3$ (the preferable mixture ratio is 40 to 45 wt. % cerium oxide to 55 to 60 wt. % yttrium oxide, in which the most preferable mixture ratio is 40 wt. % cerium oxide to 60 wt. % yttrium oxide), a mixture of tantalum oxide as $TaO_2$ or $Ta_2O_5$ and ytterbium oxide as $Yb_2O_3$ (the preferable mixture ratio is 70 wt. % tantalum oxide to 30 wt. % yttrium oxide), a mixture of silicon oxide as $SiO_2$ and zirconium oxide as $ZrO_2$ (the preferable mixture ratio is 30 wt. % silicon oxide to 70 wt. % zirconium oxide), and other composite containing one of the above-mentioned oxides as the main component.

The material having the refractive index from 1.63 to 1.64 is for instance aluminum oxide as $Al_2O_3$, lead fluoride as $PbF_2$, or other composites which contain the above-mentioned oxide or fluoride as the main component.

The material having the refractive index from 1.37 to 1.38 is for instance a fluorine compound as $MgF_2$, $CaF_2$ or $AlF_2$, or other composite which contains one of the above-mentioned compounds as the main component.

When the respective layers are formed of any one of the above-mentioned materials, it is possible to obtain the optical multilayer thin film 40 having the characteristic which is low in deterioration and therefore excellent in durability. As a result, it becomes possible to prevent cracks from occurring due to stress generated between the layers.

Further, in the present invention, the materials constituting the respective layers are not limited to only the materials described above; that is, it is possible to adopt any other materials having the respective refractive indices lying in the respective ranges.

Further, the optical film thickness $D_o$ of each of the optical thin films is not limited in particular, so long as the following equation can be satisfied:

EQUATION 1
$$\frac{n_L d}{\cos\left[\sin^{-1}\left\{\frac{n_O}{n_L}\sin\theta\right\}\right]} < D_O < \frac{n_H d}{\cos\left[\sin^{-1}\left\{\frac{n_O}{n_H}\sin\theta\right\}\right]}$$

where $n_L$ denotes the lower limit of the refractive index; $n_H$ denotes the upper limit of the refractive index; $n_o$ denotes the refractive index of a medium to which a beam is allowed to be incident; and d denoted the actual film thickness of each layer.

The respective layers can be formed in accordance with the method such as vacuum deposition, beam heating, sputtering, ion plating, etc. The film composition and thickness described above can be modified according to the determined film forming conditions. In these methods, it is possible to use substances which are relatively stable during the film forming process, so that these methods are relatively advantageous in practice.

Usage of the optical multilayer thin film 40 is not particularly limited. However, it is particularly preferable to use the thin film 40 of the present invention in a beam splitter 10 in which the optical multilayer thin film 40 is interposed between an incoming side prism 20 and an outgoing side prism 30. The above-mentioned beam splitter 10 can be manufactured by forming the optical multilayer thin film 40 on the sloping surface of the incoming side prism 20; forming a bonding layer 60 on the sloping surface of the outgoing side prism 30 by applying a bonding agent thereonto; and bonding the optical multilayer thin film 40 to the bonding layer 60.

The incoming side prism 20 is formed of a medium upon which a light beam is allowed to be incident and from which the light beam reflected from the optical multilayer thin film 40 is introduced outwardly. The outgoing side prism 30 is formed of a medium from which the light beam, passed through the optical multilayer thin film 40, is introduced outwardly.

As the material composing the incoming side prism 20 and the outgoing side prism 30, any of various transparent glass material or plastic material (e.g. acrylic base resin, polycarbonate base resin, polystyrene base resin, etc.) can be selectively adopted.

The refractive index of the Incoming side prism 20 is about between 1.45 and 1.95. On the other hand, the refractive index of the outgoing side prism 30 is approximately between 1.5 and 1.55. The effects (described later) of the optical multilayer thin film 40 become prominent when the refractive indices of each of the prisms lie within the above-mentioned ranges. Here, these refractive indices were measured at the wavelength of 780 nm.

As the bonding agent between the optical multilayer thin film 40 and the outgoing side prism 30, transparent bonding agents such as a ultraviolet ray hardened bonding agent (urethane-acrylate base resin, meta-acrylic base resin, etc.), a thermosetting bonding agent (epoxy base resin, phenol base resin, etc.), a polymerization type bonding agent, etc. can be used. It is preferable that the refractive index of the bonding agent is almost the same as that of the outgoing side prism 30. For instance, when borosilicate crown (BK 7) is used as the material of the outgoing side prism 30, a bonding agent, with the refractive index of about 1.5 to 1.55, is used. Further, the thickness of the bonding agent 60 is preferably about 3 μm or more, although it is not limited thereto.

In the beam splitter 10, formed as described above, a light beam is allowed to be incident upon the side of the first layer (1) at the angle of incidence θ equal to or greater than 40° with respect to the optical multilayer thin film 40, and preferably at the angle of incidence θ equal to or greater than 45°, as shown in FIG. 2.

In the beam splitter 10, composed of the incoming and outgoing side prisms 20 and 30 and the optical multilayer thin film 40, as described above, the reflectance of the S polarized component (a polarized component having vibrations perpendicular with respect to the plane of incidence) of reflected light is almost equal to or extremely close to that of the P polarized component (a polarized component having vibrations parallel with respect to the plane of incidence) of the same reflected light in a wide wavelength range. In practice, the difference between the two reflectances lies within a range between 0 and 10%, or 0 and 5%.

Therefore, in an optical system using such a beam splitter 10 of the present invention, particularly in a photomagnetic disk, it is possible to interpose the beam splitter midway of the optical system arranged for an MO (magnetooptic) element to split a beam toward a servo element direction, thus resulting in an advantage that the number of parts can be reduced.

In addition, according to the beam splitter as described above, the phase difference between the S and P polarized components of the reflected light can be reduced substantially to zero. As a result, if it would be used in laser application apparatus, the diameter of a laser spot can be reduced sufficiently and therefore the S/N ratio can be improved, thus resulting in enabling the realization of higher precise operation. In practice, the phase difference between the S and P polarized components of the reflected light lies within the range between approximately ±5.5°.

Further, it is possible to freely change the reflectance of the beam splitter, by appropriately selecting the sort of the incoming side prism 20 (the refractive index of the incoming side medium), the sort of the outgoing side prism 30 (the refractive index of the outgoing side medium), and the angle of incidence thereupon, without degrading the effects such as "no phase difference" and "no practical difference in reflectance between S and P polarized components of light". The changeable range of the reflectance lies within the range from 5 to 100%. In other words, the reflectance can be modified by changing only the prisms to be paired and the angle of incidence of a beam, without modifying the design of the optical multilayer thin film itself, so that it becomes possible to broaden the optical design flexibility and thereby reduce the cost of the optical system.

The material composing the incoming side prism 20 is, for instance, fluorosilicate crown (FK 3, refractive index: 1.460), borosilicate crown (BK 7, refractive index: 1.511), dense barium flint glass (BaSF6, refractive index: 1.657), dense flint glass (SF2, refractive index: 1.636), dense flint glass special (SFS1, refractive index: 1.896), lanthanum flint glass (LaF012, refractive index: 1.769), or lanthanum crown (LaK7), or the like.

On the other hand, the composing material of the outgoing side prism 30 is for instance, borosilicate crown (BK 7, refractive index: 1.511) or crown (K3), or the like.

Further, in the beam splitter 10, formed as described above, it is preferable that the respective layers 1 to 6 and the respective prisms 20 and 30 have a characteristic that does not substantially absorb light; that is, the light attenuation coefficients thereof are substantially zero. In this case, the above-mentioned effects are particularly prominent.

As described above, in the optical multilayer thin film and the beam splitter according to the present invention, the reflectance of the S and P polarized components of reflected light are substantially equal to each other in a wide wavelength range under the no phase difference condition. In addition, it is possible to easily change the optical conditions such as the reflectance, the angle of incidence, etc. by appropriately selecting materials which form the Incoming and outgoing side prisms to be paired, while maintaining the above-mentioned effects.

Further, the design flexibility can be increased for the optical system if such a beam splitter is used, thus allowing the optical system design to be diversified. Further, since the materials for the incoming and outgoing side prisms are selectable, as described above, low cost materials can be used, and thereby the cost of the beam splitter can be reduced.

The beam splitter of the present invention will be described hereinbelow with respect to various practical examples:

[EXAMPLE 1]

(1) Manufacturing of Beam Splitter

A beam splitter of this example was manufactured as follows: Dense flint glass special (SFS1, refractive index: 1.896) was used as the material of the incoming side prism. After the sloping surface of the incoming side prism had been washed precisely, the optical multilayer thin film, according to the present invention, was formed thereon by forming the first to sixth layers composed of the materials as listed in Table 1 beginning from the sloping surface side in accordance with vacuum deposition techniques. Further, a transparent bonding agent (such as the photocurable resin sold under the trademark HARD LOCK of DENKI KAGAKU KOGYO CO., ltd.) having an application thickness of 5 μm, was applied onto the sixth layer side. The outgoing side prism was bonded to the incoming light side prism via the applied transparent bonding agent. The material of the outgoing side prism was borosilicate crown (BK 7, refractive index: 1.511). The apex angle of the respective prisms was 90° (=2θ). Table 1 also lists refractive indices of the respective layers (at measuring wavelength: 780 nm) and the optical film thicknesses (hereinafter, referred to as "OPT THK").

TABLE 1

| | ($\lambda_o$ = 780 nm  θ = 45°) | | |
|---|---|---|---|
| LAYER | MATL | INDEX | OPT THK |
| INCOME MED | SFS1 | 1.896 | — |
| 1st LAYER | $Al_2O_3$ | 1.633 | 0.438 $\lambda_o$ |
| 2nd LAYER | $MgF_2$ | 1.377 | 1.098 $\lambda_o$ |
| 3rd LAYER | $Al_2O_3$ | 1.633 | 0.438 $\lambda_o$ |
| 4th LAYER | $ZrO_2$ | 2.000 | 0.337 $\lambda_o$ |
| 5th LAYER | $Al_2O_3$ | 1.633 | 0.438 $\lambda_o$ |
| 6th LAYER | $MgF_2$ | 1.377 | 1.098 $\lambda_o$ |
| OUTGO MED | BK7 | 1.511 | — |

(2) Measurement of Spectral Characteristics

Figure 3:
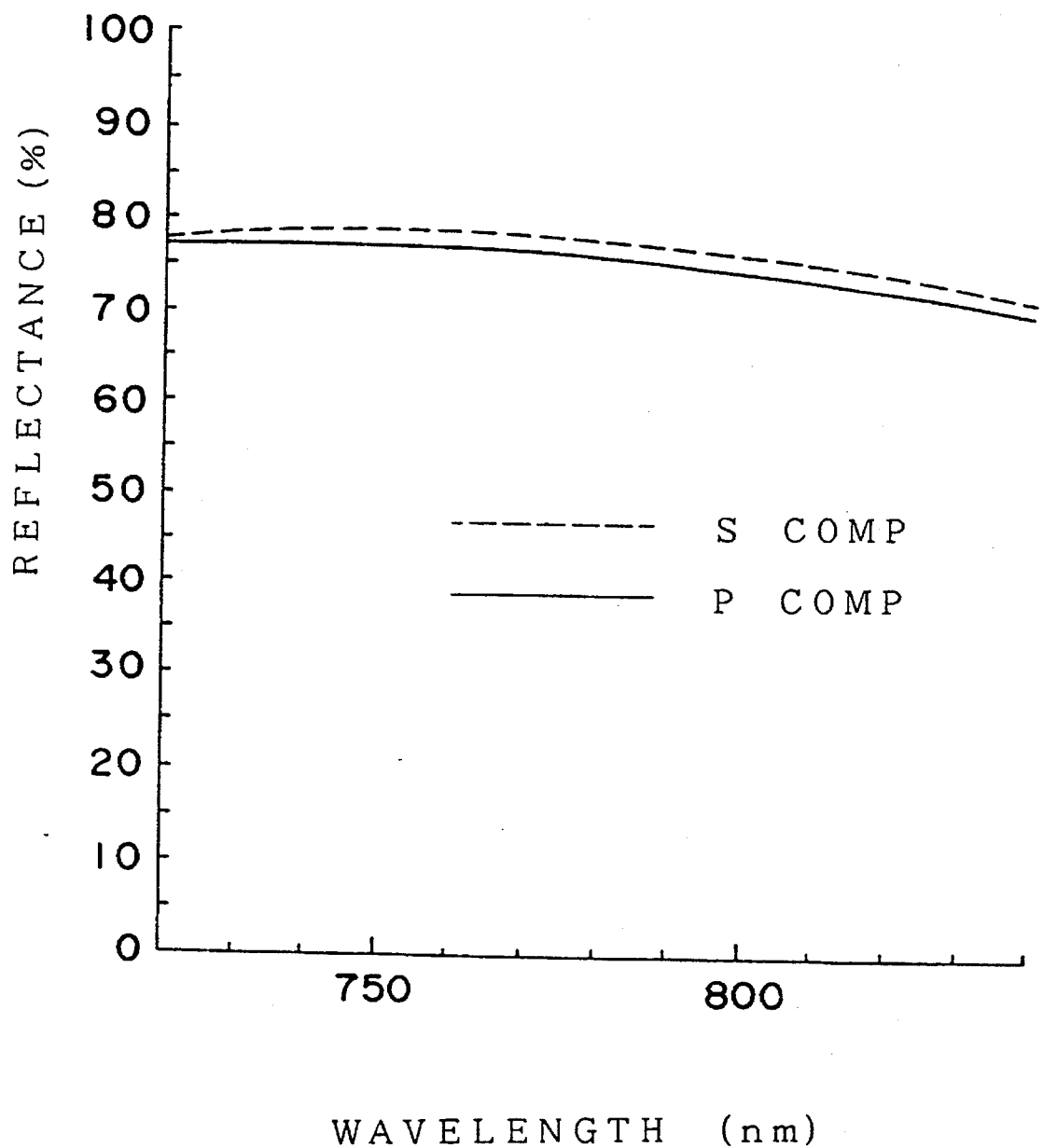
FIG. 3 is a graph showing the spectral characteristics of a first example of the present invention.

A beam with wavelengths of 720 to 840 nm (designed wavelength: $\lambda_o$=780 nm) was allowed to be incident at the angle of incidence (θ=) 45° upon the optical multilayer thin film formed on the sloping surface of the prism of the above-mentioned beam splitter, to measure the reflectances of the S and P polarized components of the reflected light, respectively. FIG. 3 is a graph which shows the measured results. The graph indicates that the difference between the reflectances of the S and P polarized components lies approximately within ±3% in a wide wavelength range of 720 to 840 nm.

(3) Measurement of Phase Difference

A beam with wavelengths of 720 to 840 nm (designed wavelength: $\lambda_o$=780 nm) was allowed to be incident at the angle of incidence ($\theta$=) 45° upon the optical multilayer thin film formed on the sloping surface of the prism of the above-mentioned beam splitter, to measure the phase difference between the S and P polarized components of the reflected light, respectively. Table 2 lists the measured results.

TABLE 2

| WL (nm) | PH DIFF (°) |
|---|---|
| 720 | 6.521 |
| 730 | 5.331 |
| 740 | 4.196 |
| 750 | 3.102 |
| 760 | 2.014 |
| 770 | 1.009 |
| 780 | 0.000 |
| 790 | −0.988 |
| 800 | −1.959 |
| 810 | −2.877 |
| 820 | −3.778 |
| 830 | −4.669 |
| 840 | −5.533 |

As listed in Table 2, the phase difference between the S and P polarized components lies within ±5° in the range between ±5% of the designed wavelength (i.e. 740 to 820 nm).

[EXAMPLE 2]

(1) Manufacturing of Beam Splitter

A beam splitter of this example was manufactured as follows: lanthanum flint glass (LaFO12, refractive index: 1.769) was used as the material of the incoming side prism. After the sloping surface of the incoming side prism had been washed precisely, the optical multilayer thin film, according to the present invention, was formed thereon by forming the first to sixth layers composed of the materials as listed in Table 3 beginning from the sloping surface side in accordance with vacuum deposition techniques. Further, a transparent bonding agent (such as the photocurable resin sold under the trademark HARD LOCK of DENKI KAGAKU KOGYO CO., ltd.) having an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 90° (=2$\theta$). Table 3 also lists the refractive indices of the respective layers (at measuring wavelength: 780 nm) and the optical film thicknesses.

TABLE 3

| ($\lambda_o$ = 780 nm  $\theta$ = 45°) | | | |
|---|---|---|---|
| LAYER | MATL | INDEX | OPY THK |
| INCOME MED | LaFO12 | 1.769 | — |
| 1st LAYER | Al$_2$O$_3$ | 1.633 | 0.389 $\lambda_o$ |
| 2nd LAYER | MgF$_2$ | 1.377 | 0.598 $\lambda_o$ |
| 3rd LAYER | Al$_2$O$_3$ | 1.633 | 0.389 $\lambda_o$ |

TABLE 3-continued

| ($\lambda_o$ = 780 nm  $\theta$ = 45°) | | | |
|---|---|---|---|
| LAYER | MATL | INDEX | OPY THK |
| 4th LAYER | Ta$_2$O$_5$ | 2.100 | 0.311 $\lambda_o$ |
| 5th LAYER | Al$_2$O$_3$ | 1.633 | 0.389 $\lambda_o$ |
| 6th LAYER | MgF$_2$ | 1.377 | 0.598 $\lambda_o$ |
| OUTGO MED | BK7 | 1.511 | — |

(2) Measurement of Spectral Characteristics

Figure 4:
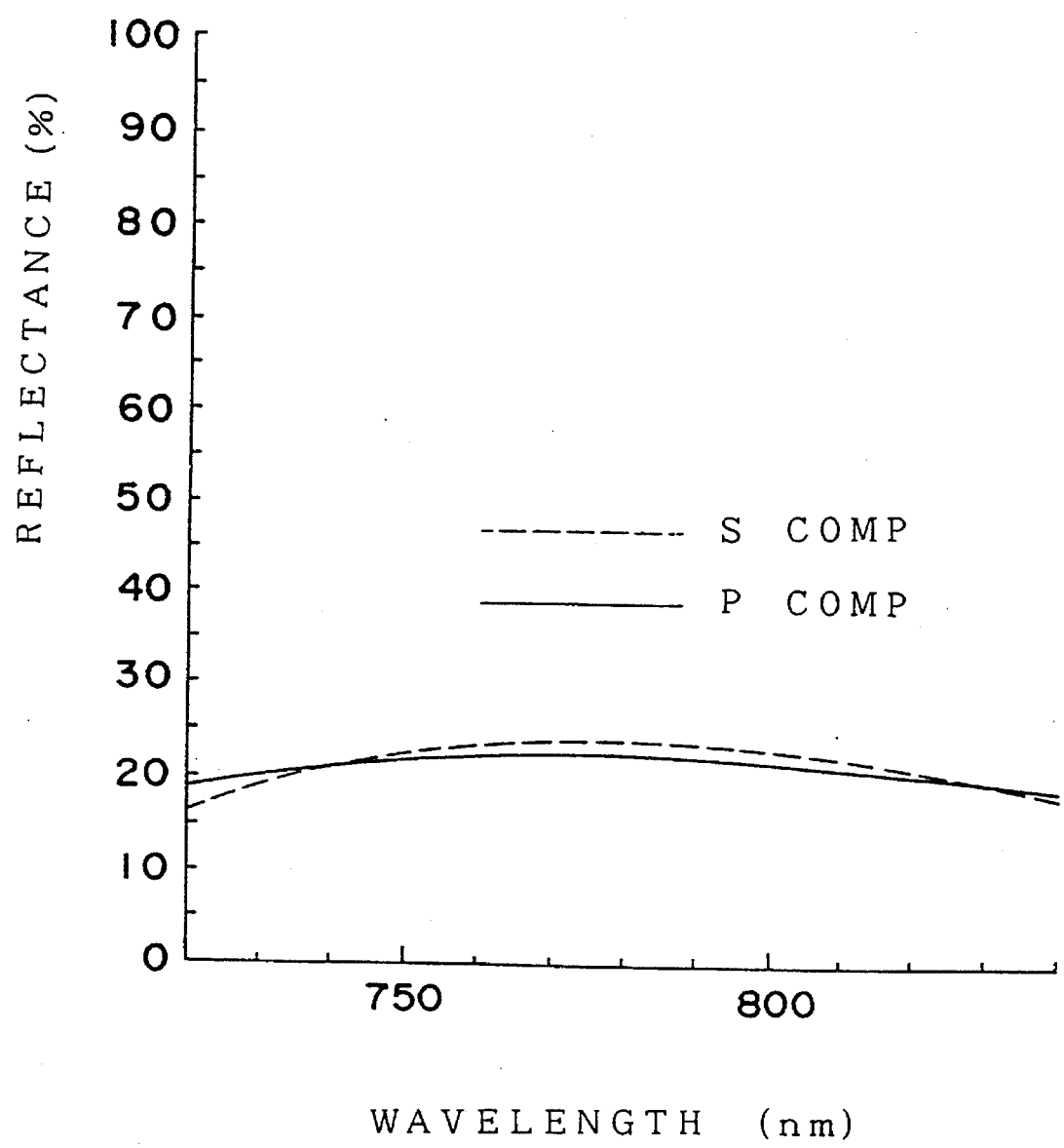
FIG. 4 is a graph showing the spectral characteristics of a second example of the present invention.

A beam with wavelengths of 720 to 840 nm (designed wavelength: $\lambda_o$=780 nm) was allowed to be incident at the angle of incidence ($\theta$=) 45° upon the optical multilayer thin film formed on the sloping surface of the prism of the above-mentioned beam splitter, to measure the reflectances of the S and P polarized components of the reflected light, respectively. FIG. 4 is a graph which shows the measured results. The graph indicates that the difference between the reflectances of the S and P polarized components lies approximately within ±3% in a wide wavelength range of 740 to 820 nm.

(3) Measurement of Phase Difference

A beam with wavelengths of 720 to 840 nm (designed wavelength: $\lambda_o$=780 nm) was allowed to be incident at the angle of incidence ($\theta$=) 45° upon the optical multilayer thin film formed on the sloping surface of the prism of the above-mentioned beam splitter, to measure the phase difference between the S and P polarized components of the reflected light. Table 4 lists the measured results.

TABLE 4

| WL (nm) | PH DIFF (°) |
|---|---|
| 720 | 4.727 |
| 730 | 3.745 |
| 740 | 2.858 |
| 750 | 2.059 |
| 760 | 1.328 |
| 770 | 0.647 |
| 780 | 0.000 |
| 790 | −0.625 |
| 800 | −1.239 |
| 810 | −1.816 |
| 820 | −2.386 |
| 830 | −2.952 |
| 840 | −3.515 |

As listed In Table 4, the phase difference between the S and P polarized components lies within ±3° in the range between ±5% of the designed wavelength (i.e. 740 to 820 nm).

[EXAMPLE 3]

(1) Manufacturing of Beam Splitter

A beam splitter of this example was manufactured as follows: dense barium flint glass (BASF6, refractive index: 1.657) was used as the material of the incoming side prism. After the sloping surface of the incoming side prism had been washed precisely, the optical multilayer thin film according to the present invention was formed thereon by forming the first to sixth layers composed of the materials as listed in Table 5 beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 90° (=2θ). Table 5 also lists the refractive indices of the respective layers (at measuring wavelength: 780 nm) and the optical film thicknesses.

TABLE 5

| LAYER | MATL | INDEX | OPT THK |
|---|---|---|---|
| | ($\lambda_o$ = 780 nm  θ = 45°) | | |
| INCOME MED | BaSF6 | 1.657 | — |
| 1st LAYER | Al$_2$O$_3$ | 1.633 | 0.359 $\lambda_o$ |
| 2nd LAYER | MgF$_2$ | 1.377 | 0.476 $\lambda_o$ |
| 3rd LAYER | Al$_2$O$_3$ | 1.633 | 0.359 $\lambda_o$ |
| 4th LAYER | TiO$_2$ | 2.258 | 0.292 $\lambda_o$ |
| 5th LAYER | Al$_2$O$_3$ | 1.633 | 0.359 $\lambda_o$ |
| 6th LAYER | MgF$_2$ | 1.377 | 0.476 $\lambda_o$ |
| OUTGO MED | BK7 | 1.511 | — |

(2) Measurement of Spectral Characteristics

Figure 5:
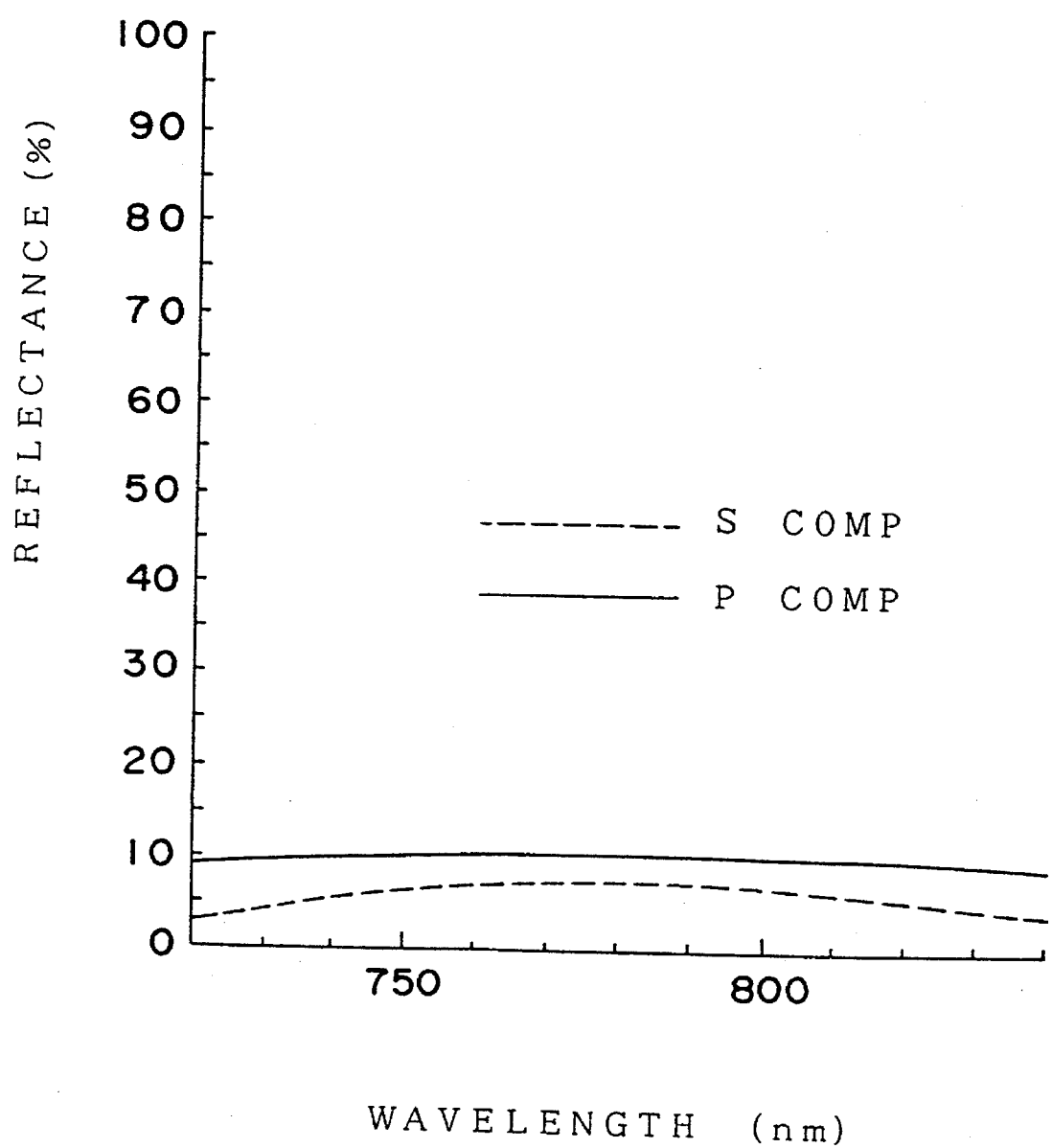
FIG. 5 is a graph showing the spectral characteristics of a third example of the present invention.

A beam with wavelengths of 720 to 840 nm (designed wavelength: $\lambda_o$=780 nm) was allowed to be incident at the angle of incidence (θ=) 45° upon the optical multilayer thin film formed on the sloping surface of the prism of the above-mentioned beam splitter, to measure the reflectances of the S and P polarized components of the reflected light, respectively. FIG. 5 is a graph which shows the measured results. The graph indicates that the difference between the reflectances of the S and P polarized components lies approximately within ±4.5% in a wide wavelength range of 740 to 820 nm.

(3) Measurement of Phase Difference

A beam with wavelengths of 720 to 840 nm (designed wavelength: $\lambda_o$=780 nm) was allowed to be incident at the angle of incidence (θ=) 45° upon the optical multilayer thin film formed on the sloping surface of the prism of the above-mentioned beam splitter, to measure the phase difference between the S and P polarized components of the reflected light, respectively. Table 6 lists the measured results.

TABLE 6

| WL (nm) | PH DIFF (°) |
|---|---|
| 740 | −4.689 |
| 750 | −3.176 |
| 760 | −1.983 |
| 770 | −0.954 |
| 780 | 0.000 |
| 790 | 0.943 |
| 800 | 1.927 |
| 810 | 3.018 |
| 820 | 4.288 |

As listed in Table 6, the phase difference between the S and P polarized components lies within ±5° in the range between ±5% of the designed wavelength (i.e. 740 to 820 nm).

[EXAMPLE 4]

(1) Manufacturing of Beam Splitter

A beam splitter of this example was manufactured as follows: lanthanum flint glass (LaFO12, refractive index: 1.769) was used as the material of the incoming side prism. After the sloping surface of the incoming side prism had been washed precisely, the optical multilayer thin film according to the present invention was formed thereon by forming the first to sixth layers of the materials as listed in Table 7 beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 90° (=2θ). Table 7 also lists the refractive indices of the respective layers (at measuring wavelength: 780 nm) and the optical film thicknesses.

TABLE 7

| LAYER | MATL | INDEX | OPT THK |
|---|---|---|---|
| | ($\lambda_o$ = 780 nm  θ = 45°) | | |
| INCOME MED | LaF012 | 1.769 | — |
| 1st LAYER | Al$_2$O$_3$ | 1.633 | 0.389 $\lambda_o$ |
| 2nd LAYER | MgF$_2$ | 1.377 | 0.598 $\lambda_o$ |
| 3rd LAYER | Al$_2$O$_3$ | 1.633 | 0.389 $\lambda_o$ |
| 4th LAYER | ZrO$_2$ | 2.006 | 0.311 $\lambda_o$ |
| 5th LAYER | Al$_2$O$_3$ | 1.633 | 0.389 $\lambda_o$ |
| 6th LAYER | MgF$_2$ | 1.377 | 0.598 $\lambda_o$ |
| OUTGO MED | BK7 | 1.511 | — |

(2) Measurement of Spectral Characteristics

Figure 6:
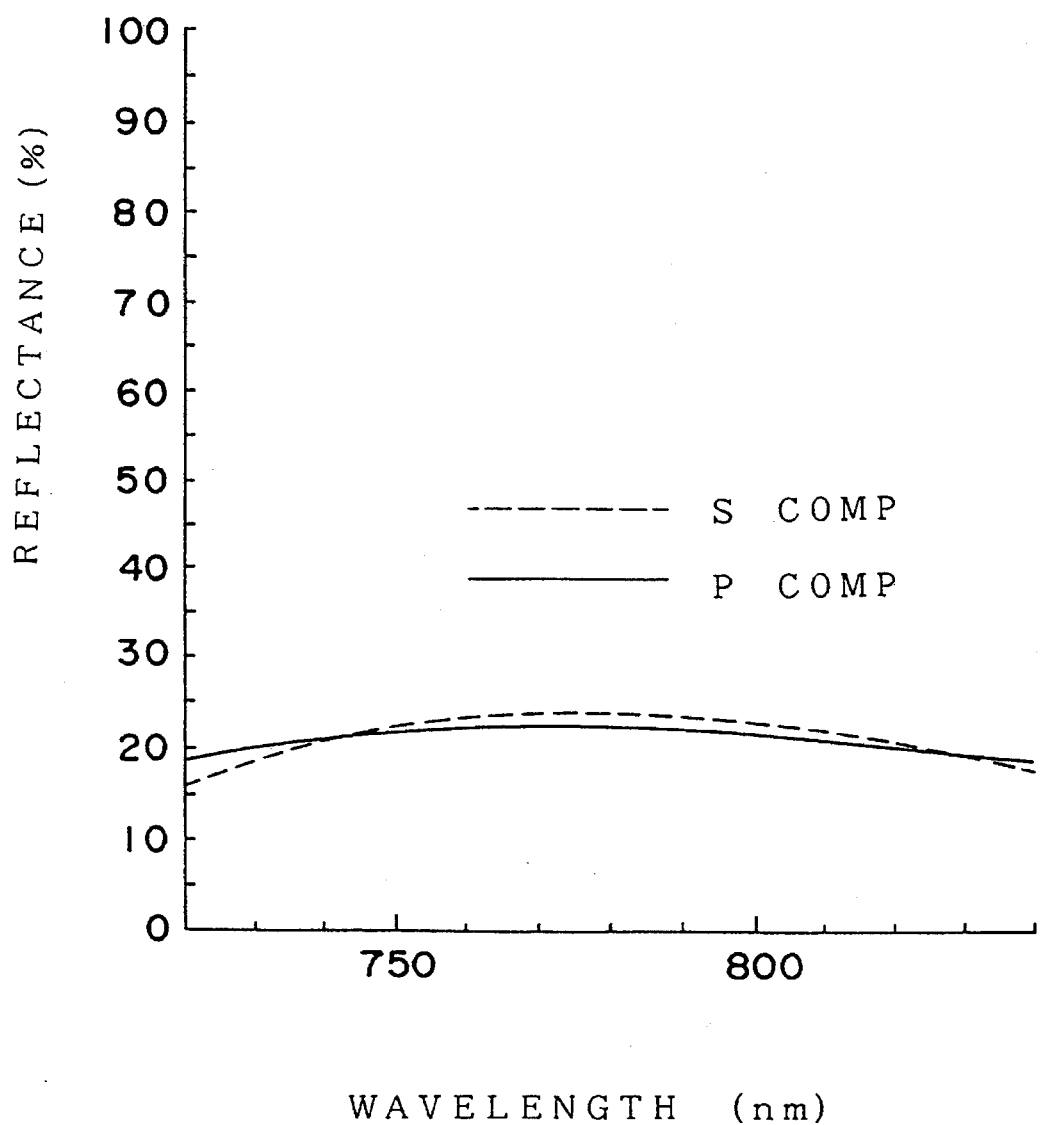
FIG. 6 is a graph showing the spectral characteristics of a fourth example of the present invention.

A beam with wavelengths of 720 to 840 nm (designed wavelength: $\lambda_o$=780 nm) was allowed to be incident at the angle of incidence (θ=) 45° upon the optical multilayer thin film formed on the sloping surface of the prism of the above-mentioned beam splitter, to measure the reflectances of the S and P polarized components of the reflected light, respectively. FIG. 6 is a graph which shows the measured results. The graph indicates that the difference between the reflectances of the S and P polarized components lies approximately within ±3% in a wide wavelength range of 720 to 840 nm.

(3) Measurement of Phase Difference

A beam with wavelengths of 720 to 840 nm (designed wavelength: $\lambda_o$=780 nm) was allowed to be incident at the angle of incidence (θ=) 45° upon the optical multilayer thin film formed on the sloping surface of the prism of the above-mentioned beam splitter, to measure the phase difference between the S and P polarized components of the reflected light, respectively. Table 8 lists the measured results.

TABLE 8

| WL (nm) | PH (DIFF (°) |
|---|---|
| 720 | 4.727 |
| 730 | 3.745 |
| 740 | 2.858 |

TABLE 8-continued

| WL (nm) | PH (DIFF (°)) |
| --- | --- |
| 750 | 2.059 |
| 760 | 1.328 |
| 770 | 0.647 |
| 780 | 0.000 |
| 790 | −0.625 |
| 800 | −1.239 |
| 810 | −1.816 |
| 820 | −2.386 |
| 830 | −2.952 |
| 840 | −3.515 |

As listed in Table 8, the phase difference between the S and P polarized components lies within ±3° in the range between ±5% of the designed wavelength (i.e. 740 to 820 nm).

[EXAMPLE 5]

(1) Manufacturing of Beam Splitter

A beam splitter of this example was manufactured as follows: lanthanum flint glass (LaFO12, refractive index: 1.769) was used as the material of the incoming side prism. After the sloping surface of the incoming side prism had been washed precisely, the optical multilayer thin film, according to the present invention, was formed thereon by forming the first to sixth layers of the materials, as listed in Table 9, beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 100° (=2θ). Table 9 also lists the refractive indices of the respective layers (at measuring wavelength: 780 nm) and the optical film thicknesses.

TABLE 9

| | ($\lambda_o$ = 780 nm  θ = 50°) | | |
| --- | --- | --- | --- |
| LAYER | MATL | INDEX | OPT THK |
| INCOME MED | LaFO12 | 1.769 | — |
| 1st LAYER | $Al_2O_3$ | 1.633 | 0.389 $\lambda_o$ |
| 2nd LAYER | $MgF_2$ | 1.377 | 0.598 $\lambda_o$ |
| 3rd LAYER | $Al_2O_3$ | 1.633 | 0.389 $\lambda_o$ |
| 4th LAYER | $TiO_2$ | 2.258 | 0.339 $\lambda_o$ |
| 5th LAYER | $Al_2O_3$ | 1.633 | 0.389 $\lambda_o$ |
| 6th LAYER | $MgF_2$ | 1.377 | 0.598 $\lambda_o$ |
| OUTGO MED | BK7 | 1.511 | — |

(2) Measurement of Spectral Characteristics

Figure 7:
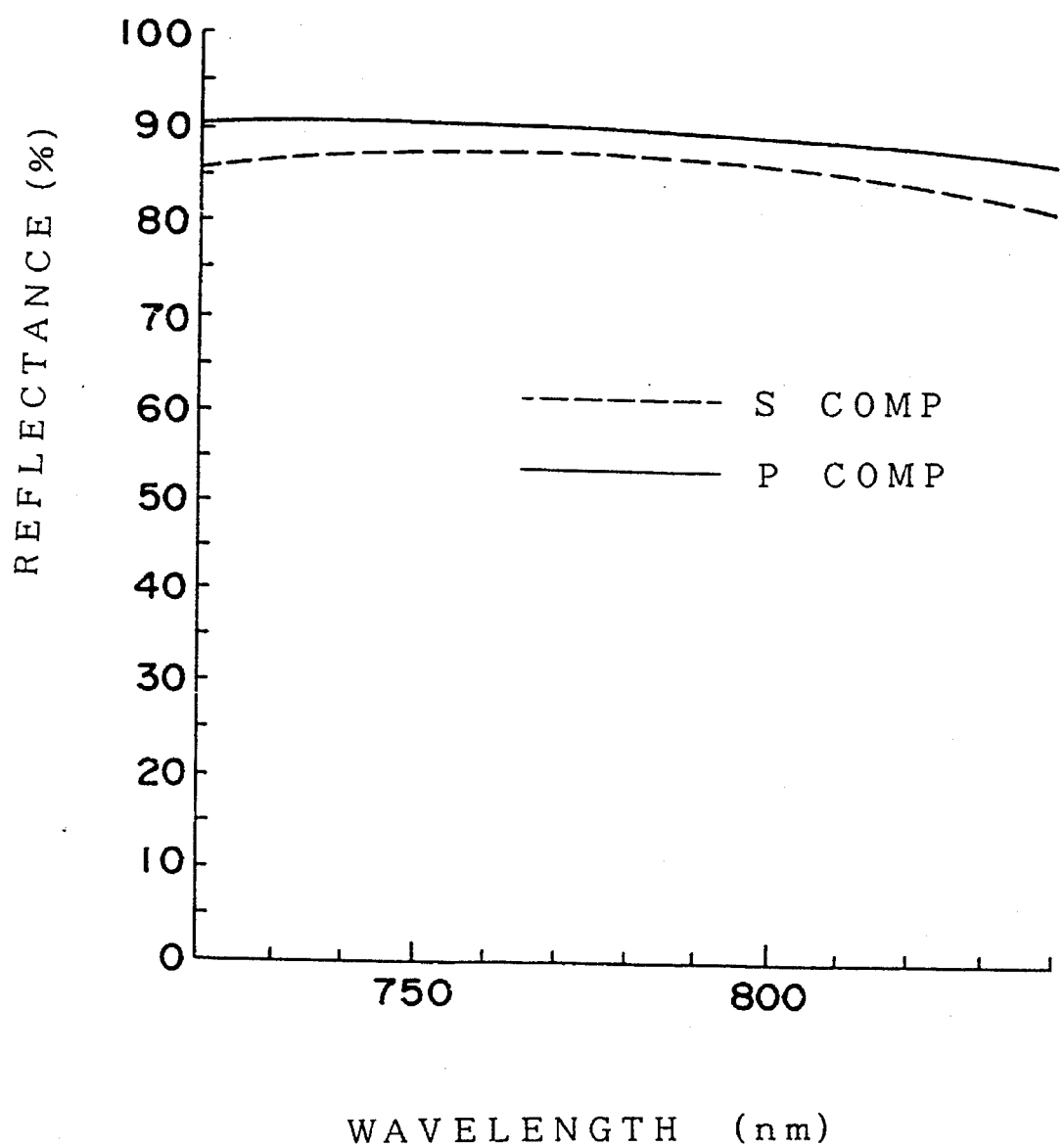
FIG. 7 is a graph showing the spectral characteristics of a fifth example of the present invention.

A beam with wavelengths of 720 to 840 nm (designed wavelength: $\lambda_o$=780 nm) was allowed to be incident at the angle of incidence (θ=) 50° upon the optical multilayer thin film formed on the sloping surface of the prism of the above-mentioned beam splitter, to measure the reflectances of the S and P polarized components of the reflected light, respectively. FIG. 7 is a graph which shows the measured results. The graph indicates that the difference between the reflectances of the S and P polarized components lies approximately within ±3.5% in a wide wavelength range of 720 to 840 nm.

(3) Measurement of Phase Difference

A beam with wavelengths of 720 to 840 nm (designed wavelength: $\lambda_o$=780 nm) was allowed to be incident at the angle of incidence (θ=) 50° upon the optical multilayer thin film formed on the sloping surface of the prism of the above-mentioned beam splitter, to measure the phase difference between the S and P polarized components of the reflected light, respectively. Table 10 lists the measured results.

TABLE 10

| WL (nm) | PH DIFF (°) |
| --- | --- |
| 720 | 2.568 |
| 730 | 2.010 |
| 740 | 1.524 |
| 750 | 1.092 |
| 760 | 0.701 |
| 770 | 0.339 |
| 780 | 0.000 |
| 790 | −0.322 |
| 800 | −0.632 |
| 810 | −0.915 |
| 820 | −1.193 |
| 830 | −1.471 |
| 840 | −1.756 |

As listed in Table 10, the phase difference between the S and P polarized components lies within ±2° in the range between ±5% of the designed wavelength (i.e. 740 to 820 nm).

[EXAMPLE 6]

(1) Manufacturing of Beam Splitter

A beam splitter of this example was manufactured as follows: dense flint glass (SF2, refractive index: 1.636) was used as the material of the incoming side prism. After the sloping surface of the incoming side prism had been washed precisely, the optical multilayer thin film, according to the present invention, was formed thereon by forming the first to sixth layers of the materials, as listed in Table 11, beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 100° (=2θ). Table 11 also lists the refractive indices of the respective layers (at measuring wavelength: 780 nm) and the optical film thicknesses.

TABLE 11

| | ($\lambda_o$ = 780 nm  θ = 50°) | | |
| --- | --- | --- | --- |
| LAYER | MATL | INDEX | OPT THK |
| INCOME MED | SF2 | 1.636 | — |
| 1st LAYER | $Al_2O_3$ | 1.633 | 0.390 $\lambda_o$ |
| 2nd LAYER | $MgF_2$ | 1.377 | 0.603 $\lambda_o$ |
| 3rd LAYER | $Al_2O_3$ | 1.633 | 0.390 $\lambda_o$ |

TABLE 11-continued ($\lambda_o$ = 780 nm  θ = 50°)

| LAYER | MATL | INDEX | OPT THK |
|---|---|---|---|
| 4th LAYER | TiO$_2$ | 2.258 | 0.301 $\lambda_o$ |
| 5th LAYER | Al$_2$O$_3$ | 1.633 | 0.390 $\lambda_o$ |
| 6th LAYER | MgF$_2$ | 1.377 | 0.603 $\lambda_o$ |
| OUTGO MED | BK7 | 1.511 | — |

(2) Measurement of Spectral Characteristics

Figure 8:
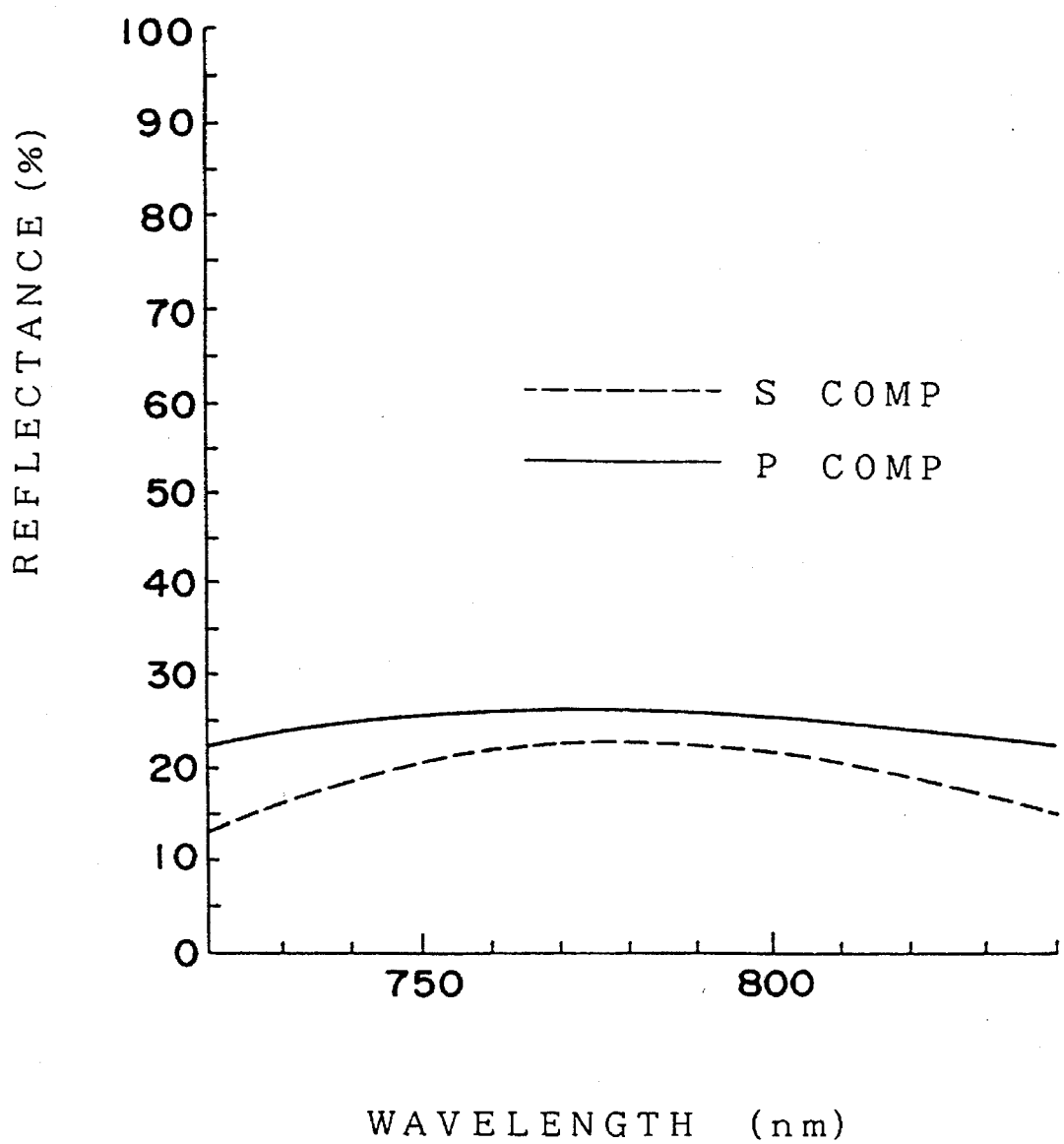
FIG. 8 is a graph showing the spectral characteristics of a sixth example of the present invention.

A beam with wavelengths of 720 to 840 nm (designed wavelength: $\lambda_o$=780 nm) was allowed to be incident at the angle of incidence (θ=) 50° upon the optical multilayer thin film formed on the sloping surface of the prism of the above-mentioned beam splitter, to measure the reflectances of the S and P polarized components of the reflected light, respectively. FIG. 8 is a graph shows the measured results. The graph indicates that the difference between the reflectances of the S and P polarized components lies approximately within ±5% in a wide wavelength range of 750 to 810 nm.

(3) Measurement of Phase Difference

A beam with wavelengths of 720 to 840 nm (designed wavelength: $\lambda_o$=780 nm) was allowed to be incident at the angle of incidence (θ=) 50° upon the optical multilayer thin film formed on the sloping surface of the prism of the above-mentioned beam splitter, to measure the phase difference between the S and P polarized components of the reflected light, respectively. Table 12 lists the measured results.

TABLE 12

| WL (nm) | PH DIFF (°) |
|---|---|
| 720 | −3.809 |
| 730 | −2.804 |
| 740 | −2.104 |
| 750 | −1.530 |
| 760 | −1.007 |
| 770 | −0.501 |
| 780 | 0.000 |
| 790 | 0.502 |
| 800 | 1.010 |
| 810 | 1.545 |
| 820 | 2.122 |
| 830 | 2.773 |
| 840 | 3.555 |

As listed in Table 12, the phase difference between the S and P polarized components lies within ±2.5° in the range between ±5% of the designed wavelength (i.e. 740 to 820 nm).

[EXAMPLE 7]

(1) Manufacturing of Beam Splitter

A beam splitter of this example was manufactured as follows: borosilicate crown (BK 7, refractive index: 1.511) was used as the material of the incoming side prism. After the sloping surface of the incoming side prism had been washed precisely, the optical multilayer thin film, according to the present invention, was formed thereon by forming the first to sixth layers of the materials, as listed in Table 13, beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 120° (=2θ). Table 13 also lists the refractive indices of the respective layers (at measuring wavelength: 780 nm) and the optical film thicknesses.

TABLE 13

($\lambda_o$ = 780 nm  θ = 60°)

| LAYER | MATL | INDEX | OPT THK |
|---|---|---|---|
| INCOME MED | BK7 | 1.511 | — |
| 1st LAYER | Al$_2$O$_3$ | 1.633 | 0.418 $\lambda_o$ |
| 2nd LAYER | MgF$_2$ | 1.377 | 0.802 $\lambda_o$ |
| 3rd LAYER | Al$_2$O$_3$ | 1.633 | 0.418 $\lambda_o$ |
| 4th LAYER | TiO$_2$ | 2.258 | 0.307 $\lambda_o$ |
| 5th LAYER | Al$_2$O$_3$ | 1.633 | 0.418 $\lambda_o$ |
| 6th LAYER | MgF$_2$ | 1.377 | 0.802 $\lambda_o$ |
| OUTGO MED | BK7 | 1.511 | — |

(2) Measurement of Spectral Characteristics

Figure 9:
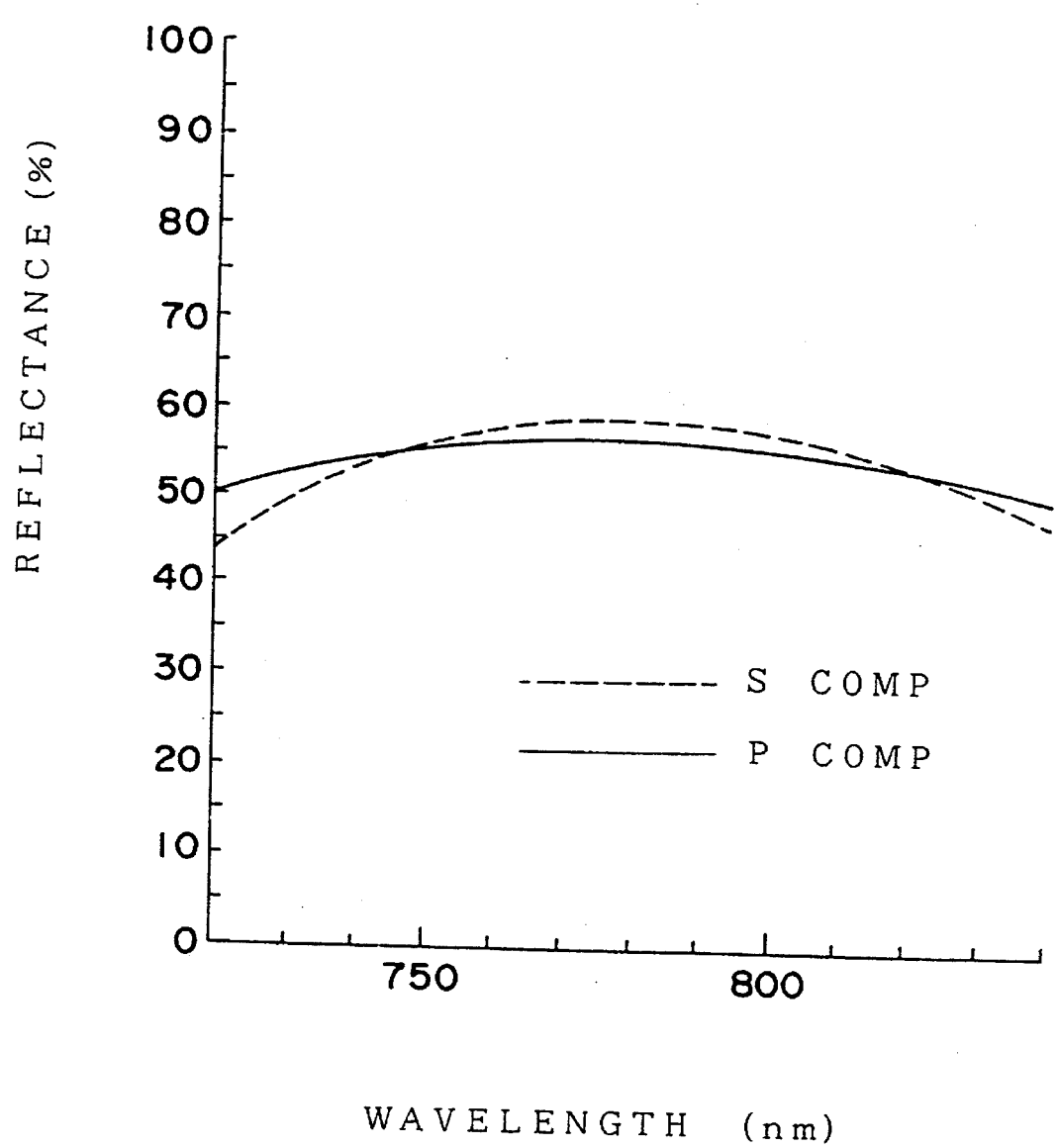
FIG. 9 is a graph showing the spectral characteristics of a seventh example of the present invention.

A beam with wavelengths of 720 to 840 nm (designed wavelength: $\lambda_o$=780 nm) was allowed to be incident at the angle of incidence (θ=) 60° upon the optical multilayer thin film formed on the sloping surface of the prism of the above-mentioned beam splitter, to measure the reflectances of the S and P polarized components of the reflected light, respectively. FIG. 9 is a graph which shows the measured results. The graph indicates that the difference between the reflectances of the S and P polarized components lies approximately within ±3.5% in a wide wavelength range of 730 to 840 nm.

(3) Measurement of Phase Difference

A beam with wavelengths of 720 to 840 nm (designed wavelength: $\lambda_o$=780 nm) was allowed to be incident at the angle of incidence (θ=) 50° upon the optical multilayer thin film formed on the sloping surface of the prism of the above-mentioned beam splitter, to measure the phase difference between the S and P polarized components of the reflected light, respectively. Table 14 lists the measured results.

TABLE 14

| WL (nm) | PH DIFF (°) |
|---|---|
| 720 | −5.603 |
| 730 | −4.700 |
| 740 | −3.806 |
| 750 | −2.881 |
| 760 | −1.929 |
| 770 | −0.963 |
| 780 | 0.000 |
| 790 | 0.946 |
| 800 | 1.863 |
| 810 | 2.740 |
| 820 | 3.581 |
| 830 | 4.389 |
| 840 | 5.178 |

As listed in Table 14, the phase difference between the S and P polarized components lies within ±4° in the range between ±5% of the designed wavelength (i.e. 740 to 820 nm).

[EXAMPLE 8]

(1) Manufacturing of Beam Splitter

A beam splitter of this example was manufactured as follows: fluorosilicate crown (FK 3, refractive index: 1.460) was used as the material of the incoming side prism. After the sloping surface of the incoming side prism had been washed precisely, the optical multilayer thin film according to the present invention was formed thereon by forming the first to sixth layers of the materials, as listed in Table 15, beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 130° (=2θ). Table 15 also lists the refractive indices of the respective layers (at measuring wavelength: 780 nm) and the optical film thicknesses.

TABLE 15

| LAYER | MATL | INDEX | OPT THK |
|---|---|---|---|
| \multicolumn{4}{c}{($\lambda_o$ = 780 nm  θ = 65°)} |
| INCOME MED | FK3 | 1.460 | — |
| 1st LAYER | Al$_2$O$_3$ | 1.633 | 0.426 $\lambda_o$ |
| 2nd LAYER | MgF$_2$ | 1.377 | 0.900 $\lambda_o$ |
| 3rd LAYER | Al$_2$O$_3$ | 1.633 | 0.426 $\lambda_o$ |
| 4th LAYER | TiO$_2$ | 2.258 | 0.308 $\lambda_o$ |
| 5th LAYER | Al$_2$O$_3$ | 1.633 | 0.426 $\lambda_o$ |
| 6th LAYER | MgF$_2$ | 1.377 | 0.900 $\lambda_o$ |
| OUTGO MED | BK7 | 1.511 | — |

(2) Measurement of Spectral Characteristics

Figure 10:
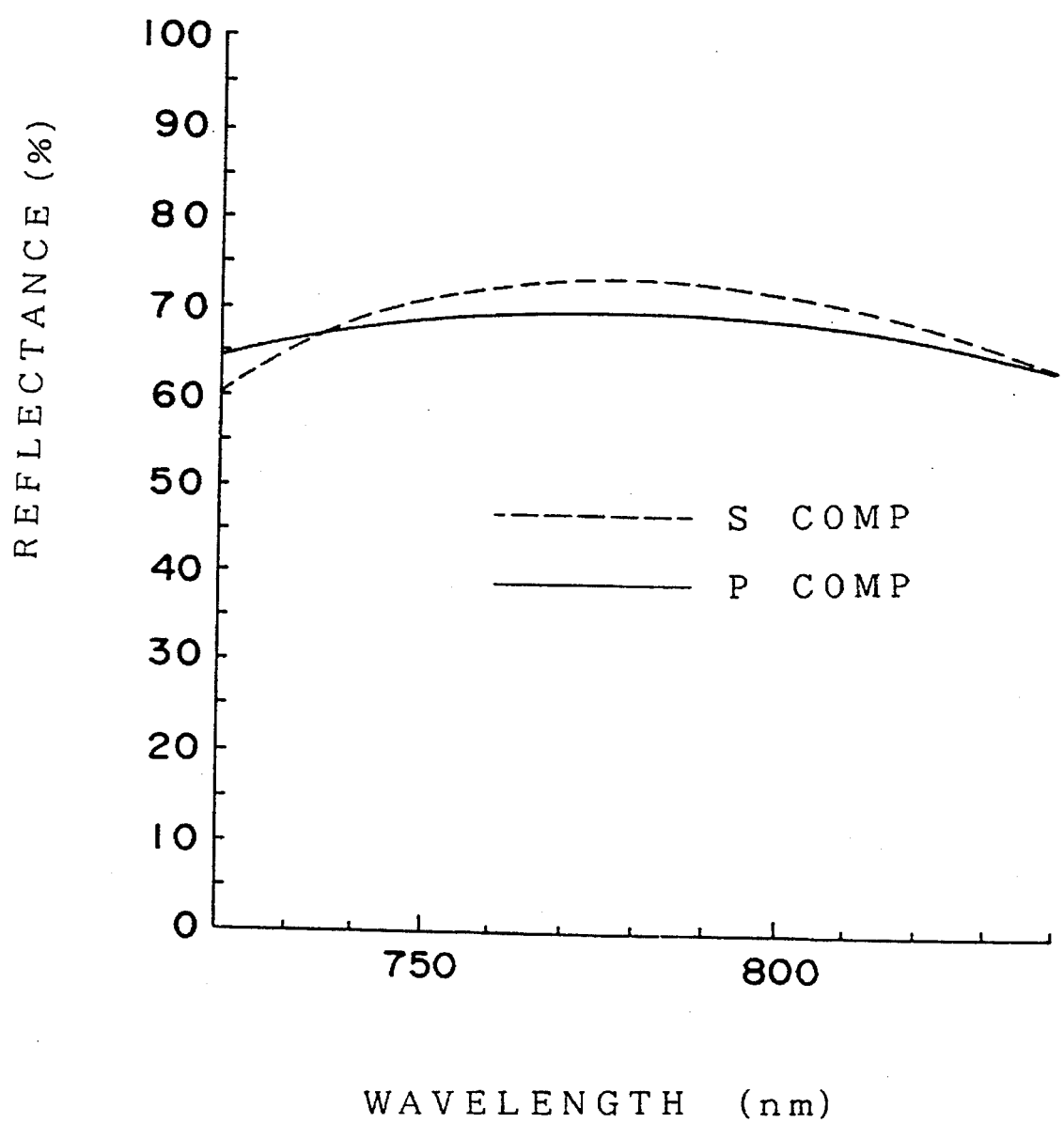
FIG. 10 is a graph showing the spectral characteristics of an eighth example of the present invention.

A beam with wavelengths of 720 to 840 nm (designed wavelength: $\lambda_o$=780 nm) was allowed to be incident at an incident angle (θ=) 65° upon the optical multilayer thin film formed on the sloping surface of the prism of the above-mentioned beam splitter, to measure the reflectances of the S and P polarized components of the reflected light, respectively. FIG. 10 is a graph shows the measured results. The graph indicates that the difference between the reflectances of the S and P polarized components lies approximately within ±5% in a wide wavelength range of 720 to 840 nm.

(3) Measurement of Phase Difference

A beam with wavelengths of 720 to 840 nm (designed wavelength: $\lambda_o$=780 nm) was allowed to be incident at an incident angle (θ=) 65° upon the optical multilayer thin film formed on the sloping surface of the prism of the above-mentioned beam splitter, to measure the phase difference between the S and P polarized components of the reflected light, respectively. Table 16 lists the measured results.

TABLE 16

| WL (nm) | PH DIFF (°) |
|---|---|
| 720 | −5.781 |
| 730 | −4.921 |
| 740 | −4.001 |
| 750 | −3.028 |
| 760 | −2.025 |
| 770 | −1.010 |
| 780 | 0.000 |
| 790 | 0.991 |
| 800 | 1.951 |
| 810 | 2.865 |
| 820 | 3.736 |
| 830 | 4.561 |
| 840 | 5.341 |

As listed in Table 16, the phase difference between the S and P polarized components lies within ±5° in the range between ±5% of the designed wavelength (i.e. 740 to 820 nm).

[EXAMPLE 9]

(1) Manufacturing of Beam Splitter

A beam splitter of this example was manufactured as follows: fluorosilicate crown (FK 3, refractive index: 1.460) was used as the material of the incoming side prism. After the sloping surface of the incoming side prism had been washed precisely, the optical multilayer thin film, according to the present invention, was formed thereon by forming the first to sixth layers of the materials, as listed in Table 17, beginning from the sloping surface side in accordance with vacuum deposition techniques. Further, a transparent bonding agent (such as the photocurable resin sold under the trademark HARD LOCK of DENKI KAGAKU KOGYO CO., ltd.) with an application thickness of 5 μm, was applied onto the sixth layer side. The outgoing side prism was bonded to the incoming side prism via the applied transparent bonding agent. The material of the outgoing side prism was borosilicate crown (BK 7, refractive index: 1.511). The apex angle of the respective prisms was 136° (=2θ). Table 17 also lists the refractive indices or the respective layers (at measuring wavelength: 780 nm) and the optical film thicknesses.

TABLE 17

| LAYER | MATL | INDEX | OPT THK |
|---|---|---|---|
| \multicolumn{4}{c}{($\lambda_o$ = 780 nm  θ = 68°)} |
| INCOME MED | FK3 | 1.460 | — |
| 1st LAYER | Al$_2$O$_3$ | 1.633 | 0.446 $\lambda_o$ |
| 2nd LAYER | MgF$_2$ | 1.377 | 1.352 $\lambda_o$ |
| 3rd LAYER | Al$_2$O$_3$ | 1.633 | 0.446 $\lambda_o$ |
| 4th LAYER | TiO$_2$ | 2.258 | 0.312 $\lambda_o$ |
| 5th LAYER | Al$_2$O$_3$ | 1.633 | 0.446 $\lambda_o$ |
| 6th LAYER | MgF$_2$ | 1.377 | 1.352 $\lambda_o$ |
| OUTGO MED | BK7 | 1.511 | — |

(2) Measurement of Spectral Characteristics

Figure 11:
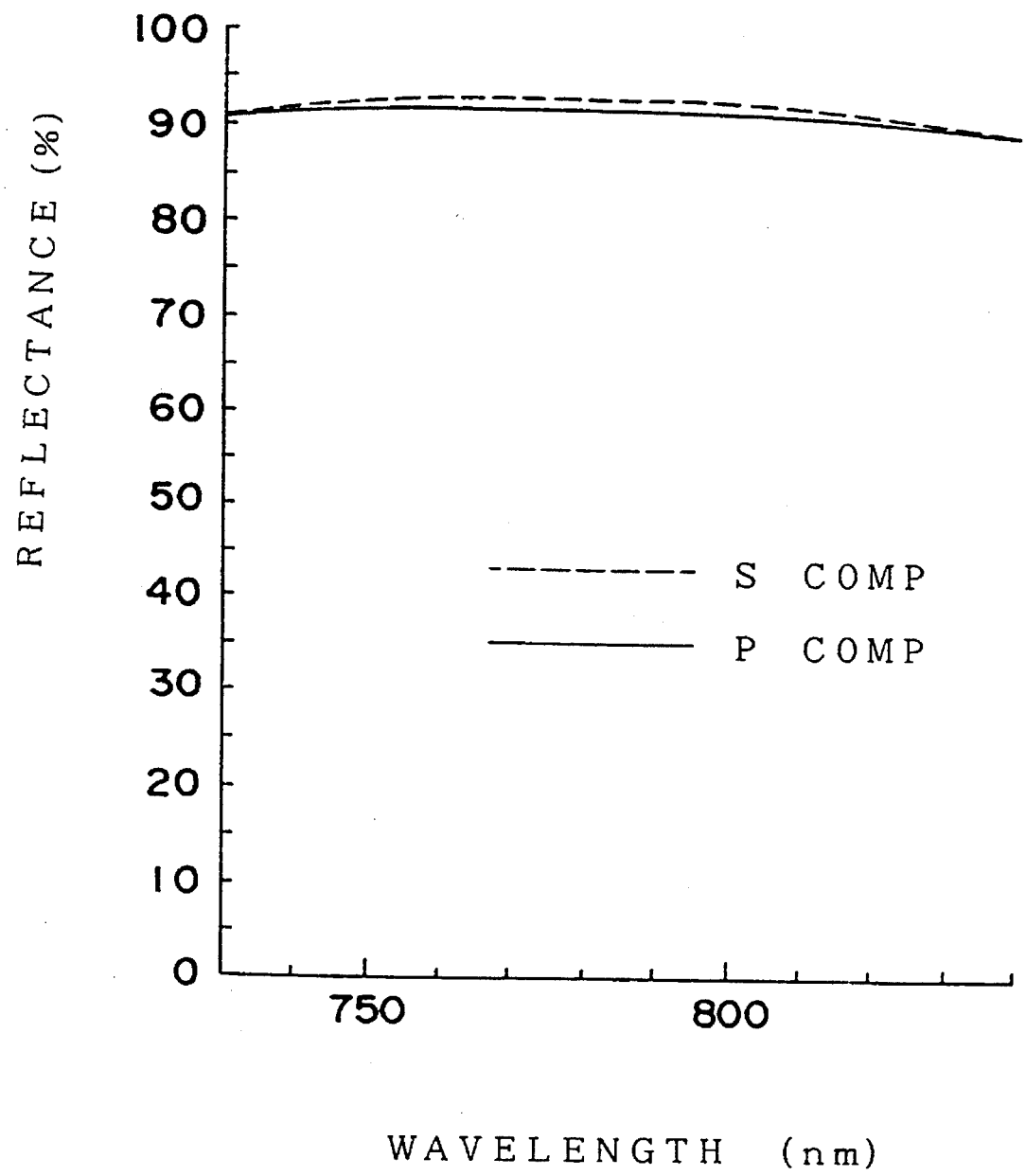
FIG. 11 is a graph showing the spectral characteristics of a ninth example of the present invention.

A beam with wavelengths of 720 to 840 nm (designed wavelength: $\lambda_o$=780 nm) was allowed to be incident at the angle of incidence (θ=) 68° upon the optical multilayer thin film formed on the sloping surface of the prism of the above-mentioned beam splitter, to measure the reflectances of the S and P polarized components of the reflected light, respectively. FIG. 11 is a graph which shows the measured results. The graph indicates that the difference between the reflectances of the S and P polarized components lies approximately within ±1.5% in a wide wavelength range of 720 to 840 nm.

(3) Measurement of Phase Difference

A beam with wavelengths of 720 to 840 nm (designed wavelength: $\lambda_o$=780 nm) was allowed to be incident at the angle of incidence (θ=) 68° upon the optical multilayer thin film formed on the sloping surface of the prism of the above-mentioned beam splitter, to measure the phase difference between the S and P polarized components of the reflected light, respectively. Table 18 lists the measured results.

TABLE 18

| WL (nm) | PH DIFF (°) |
|---|---|
| 720 | −3.499 |
| 730 | −3.083 |
| 740 | −2.548 |
| 750 | −1.946 |
| 760 | −1.308 |
| 770 | −0.654 |
| 780 | 0.000 |
| 790 | 0.644 |
| 800 | 1.269 |
| 810 | 1.858 |
| 820 | 2.413 |
| 830 | 2.922 |
| 840 | 3.373 |

As listed in Table 18, the phase difference between the S and P polarized components lies within ±3° in the range between ±5% of the designed wavelength (i.e. 740 to 820 nm).

[EVALUATION OF RESPECTIVE EXAMPLES]

Table 19 lists the incoming side medium, the refractive index (at wavelength: 780 nm) of the incoming side medium, the angle of incidence, and the reflectance (at wavelength: 780 nm) of each of the Examples.

In Table 19, the reflectance is a mean value of both the reflectance of the P and S polarized components at the designed wavelength (=780 nm), and the phase difference between the P and S polarized components is measured at the wavelength from 740 to 820 nm. Further, the phase difference means the difference between the reflectances of the S and P polarized components at the designed wavelength (=780 nm), that is (PH.DIFF.=$R_P$–$R_S$). Furthermore, in these examples, the outgoing side medium is common to all the examples, which is formed of borosilicate crown (BK7) of which refractive index is 1.511.

TABLE 19

| EXAM-PLE | INCOM MED | INDEX | INC ANGLE | REFLEC-TANCE (%) | PH DIFF (°) |
|---|---|---|---|---|---|
| 1st EX | SFS1 | 1.896 | 45° | 76.926 | ±5.5 |
| 2nd EX | LaF012 | 1.769 | 45° | 23.056 | ±3.5 |
| 3rd EX | BaSF6 | 1.657 | 45° | 8.743 | ±5.0 |
| 4th EX | LaF012 | 1.769 | 45° | 23.056 | ±3.5 |
| 5th EX | LaF012 | 1.769 | 50° | 90.191 | ±2.0 |
| 6th EX | SF2 | 1.636 | 50° | 24.465 | ±3.5 |
| 7th EX | BK7 | 1.511 | 60° | 57.730 | ±5.5 |
| 8th EX | FK3 | 1.460 | 65° | 71.837 | ±5.5 |
| 9th EX | FK3 | 1.460 | 68° | 92.138 | ±3.5 |

In these Examples from 1 to 9, the difference between the the reflectances of P and S polarized components lies within a range less than 3.5%. Further, the phase difference between the P and S polarized components lies within a range less than ±5.5° in a range between ±40 nm of the designed wavelength.

Further, in these Examples from 1 to 9, additionally, the reflectance can be determined freely on the basis of selection and combination of the incoming side medium and the angle of incidence in an extremely wide range from 8 to 92%. In this regard, it should be noted that the Examples from 8 to 9 show that it is possible to obtain wide range reflectances on the basis of only the selection and combination of the incoming side medium and the incidence angle, without changing the compositions of the optical multilayer thin film.

Another embodiment of the beam splitter 100, according to the present invention, will be described hereinbelow with reference to the attached drawings.

Figure 12:
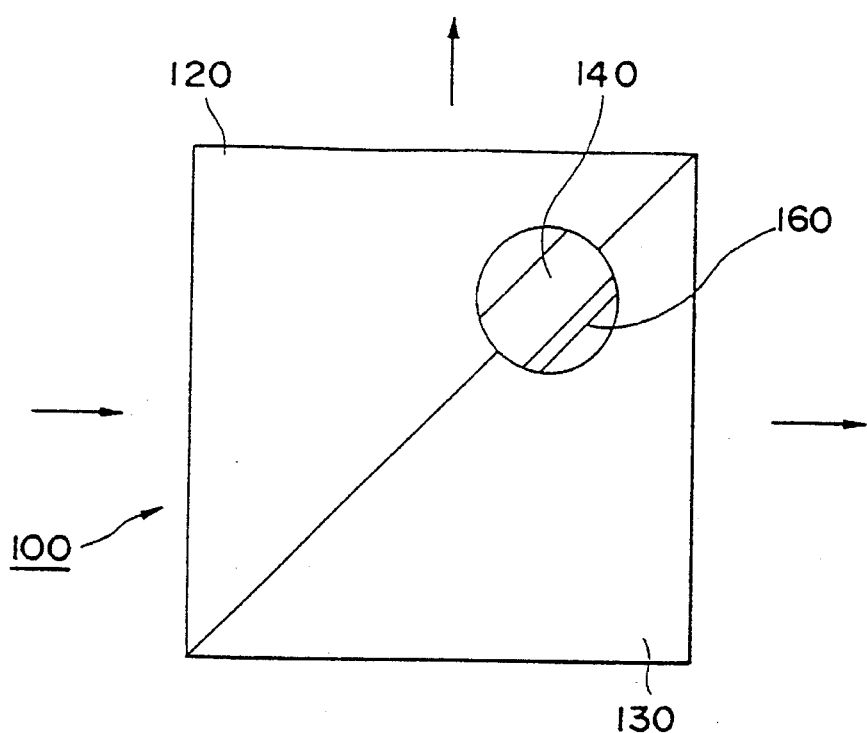
FIG. 12 is a side view of a beam splitter according to the present invention.

FIG. 12 shows a side view of a polarizing light beam splitter 100 provided with a multilayer polarizing light separating film 140 (as an optical multilayer thin film) between an incoming side prism 120 and an outgoing side prism 130. For instance, the beam splitter 100 is formed by forming the multilayer polarizing light separating film 140 on the sloping surface of the incoming side prism 120; forming a bonding agent layer 160 on the sloping surface of the outgoing side prism 130 by applying a bonding agent thereonto; and then bonding the multilayer polarizing light separating film 140 formed on the incoming side prism 120 with the bonding agent layer 160 formed on the outgoing side prism 130.

The incoming side prism 120 is a medium upon which a light beam is allowed to be incident and through which the light beam, reflected from the multilayer polarizing light separating film 140, is introduced outside the beam splitter. The outgoing side prism 130 is a medium through which the light beam passed through the multilayer polarizing light separating film 140 is introduced outside the beam splitter.

As the composing material of the incoming side prism 120 and the outgoing side prism 130, various transparent glass materials or plastic materials such as acrylic base resin, polycarbonate base resin, polystyrene base resin, etc. can be used.

The refractive index of the incoming side prism 120 is approximately between 1.89 and 1.91 (at measuring wavelength: 550 nm) and preferably approximately between 1.895 and 1.905. On the other hand, the refractive index of the outgoing side prism 130 is approximately between 1.05 and 1.55. The effects (described later) of the polarizing light beam splitter are prominent when the refractive indices of the prisms lie within the above-mentioned ranges. Here, the refractive indices were measured at the wavelength of 780 nm.

Material having the refractive indices within the range as described above can be given as follows. Namely, as the material of the incoming side prism 120, dense flint glass specials (SFS1, SFSO1, SFSO2) etc. can be selectively used, and as that of the outgoing side prism 130 borosilicate crown (BK7), crown (K3), crown flint glass (KF6), etc. are used, for instance.

It is preferable that the bonding agent used to bond the multilayer polarizing light separating film 140 with the outgoing side prism 130 has a refractive index substantially the same as that of the outgoing side prism 130. That is, it is preferable to use a bonding agent such as the photocurable resin sold, under the trademark HARD LOCK having almost the same refractive index as that of BK7.

Figure 13:
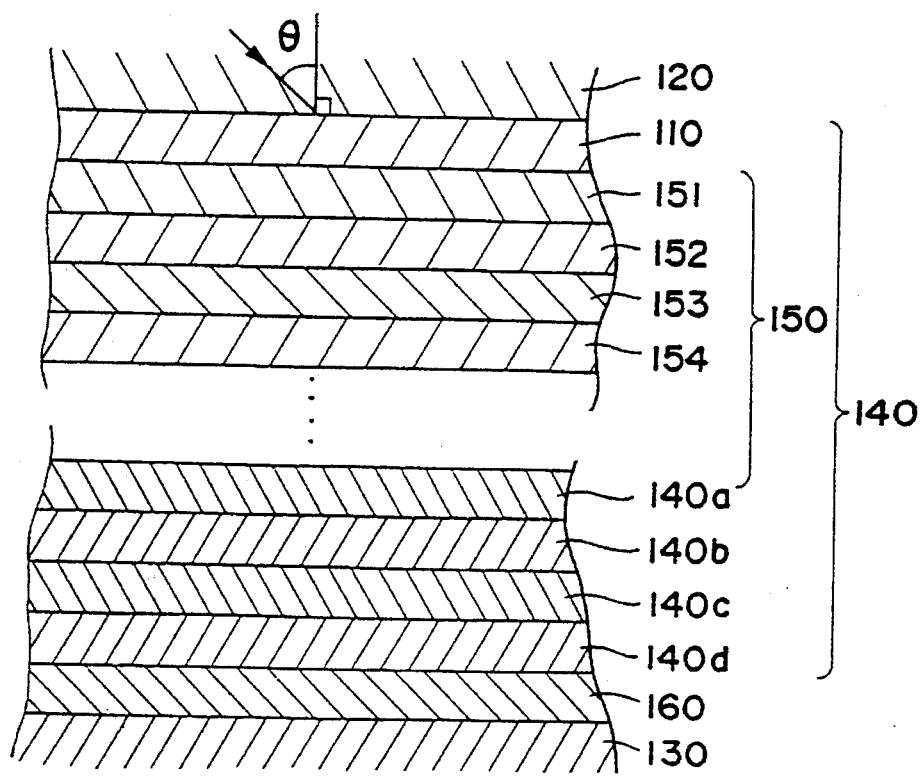
FIG. 13 is an enlarged cross-sectional view showing the layered structure of an optical multilayer thin film used in the beam splitter.

FIG. 13 is an enlarged cross-sectional side view showing the multilayer polarizing light separating film 140. As shown, the multilayer polarizing light separating film 140 is formed on the sloping surface of the incoming side prism 120.

The multilayer polarizing light separating film 140 interposed between two rectangular prisms 120 and 130 will be described hereinbelow as the typical example.

The multilayer polarizing light separating film 140 is composed of a first layer 110, a plurality of lamination layers 150, an "a" layer 140a, a "b" layer 140b, a "c" layer 140c, and a "d" layer 140d which are laminated in this order beginning from the incoming side prism 120.

Each of the lamination layers 150 is composed of four sublayers constituting one unit, and a single unit or plural units of this lamination layer are repeatedly stacked upon each other on the first layer 110. The four sublayers have four different refractive indices, respectively. In more detail, the refractive index of the first sublayer 151 of the lamination layer 150 beginning from the first layer (110) side lies approximately from 1.63 to 1.68 and more preferably from 1.63 to 1.64; that of the second sublayer 152 thereof lies approximately from 1.37 to 1.38 and more preferably from 1.375 to 1.380; that of the third sublayer 153 thereof lies approximately from 1.44 to 1.48 and more preferably from 1.46 to 1.48; and that of the fourth sublayer 154 thereof lies from 2.2 to 2.4 and more preferably from 2.2 to 2.3.

Further, the refractive index of the first layer 110 lies approximately from 2.0 to 2.1 and more preferably from 2.00 to 2.05; that of the "a" layer 140a lies approximately from 1.63 to 1.68 and more preferably from 1.63 to 1.64; that of the "b" layer 140b lies approximately from 1.37 to 1.38 and more preferably fromm 1.375 to 1.38; that of the "c" layer 140c lies from 1.44 to 1.48 and more preferably from 1.46 to 1.48; and that of the "d" layer 140d lies from 1.63 to 1.68 and more preferably from 1.63 to 1.64. Here, these refractive indices were measured at the wavelength of 780 nm.

The composing material of the respective layers of the multilayer polarizing light separating film 140 can be shown as follows:

The material with the refractive index from 2.2 to 2.4 is for instance titanium oxide as $TiO_2$, cerium oxide as $CeO_2$ or other composites comprising one of the above-mentioned substances as the main component.

The material with the refractive index from 2.0 to 2.1 is for instance zirconium oxide as $ZrO_2$, tantalum oxide as $TaO_2$ and $Ta_2O_5$, praseodymium oxide as $Pr_6O_{11}$, a mixture of cerium oxide as $CeO_2$ and yttrium oxide as $Y_2O_3$ (the preferable mixture ratio is 40 wt. % cerium oxide to 60 wt. % yttrium oxide), hafnium oxide as $HfO_2$, niobium oxide as $Nd_2O_3$, and other composites comprising one of the above-mentioned substances as the main component:

The material with the refractive index from 1.63 to 1.68 is for instance aluminum oxide as $Al_2O_3$, cerium fluoride as $CeF_3$, lead fluoride as $PbF_2$, and other composites comprising one of the above-mentioned substances as the main component.

The composing material having the refractive index from 1.44 to 1.48 is for instance silicon oxide as $SiO_2$, a mixture of fluorine compound as $MgF_2$ and aluminum oxide as $Al_2O_3$ (the preferable mixture ratio is 52 wt. % fluorine compound $MgF_2$ and 48 wt. % aluminum oxide $Al_2O_3$), thorium fluoride as $ThF_4$, and other composites comprising one of the above-mentioned substances as the main component.

The composing materials having the refractive index from 1.37 to 1.38 is for instance fluorine compound as $MgF_2$ or $CaF_2$ and other composites comprising one of the above-mentioned substances as the main component.

When the respective layers are formed of any of the above-mentioned materials, it is possible to obtain a multilayer polarizing light separating film 140 having characteristics low in deterioration and therefore excellent in durability. Further, when the above-mentioned materials such as $Al_2O_3$, $SiO_2$, $MgF_2$ and $TiO_2$ are used in each layer, respectively, a stable film can be formed in accordance with the vacuum deposition technique, which provides high practical advantage.

Further, in the present invention, the materials forming the respective layers are not limited to only the materials described above; that it, it is possible to adopt any other materials having the refractive indices lying the respective ranges mentioned above.

Further, film thickness $D_o$ of the respective optical thin films are not limited in particular. In this case, however, it should be noted that the film thickness can be represented by the Equation 1 in the same way as with the case of the first embodiment, where $n_L$ denotes the lower limit of the refractive index; $n_H$ denotes the upper limit of the refractive index; $n_o$ denotes the refractive index of the incoming side medium; and d denotes the film thickness of the layer, respectively.

In particular, when $\lambda_o$ denotes the designed wavelength, the range of the optical film thickness is from 1.057 $\lambda_o$ to 1.218 $\lambda_o$ when the material with the refractive index from 1.37 to 1.38 is used; the value of the optical film thickness is 0.686 $\lambda_o$ when the material with the refractive index from 1.44 to 1.48 is used; the range of the optical film thickness is from 0.440 $\lambda_o$ to 0.591 $\lambda_o$ when the material with the refractive index from 1.63 to 1.68 is used; the range of the optical film thickness is from 0.325 $\lambda_o$ to 0.337 $\lambda_o$ when the material with the refractive index from 2.0 to 2.1 is used; and the range of the optical film thickness is from 0.301 $\lambda_o$ to 0.315 $\lambda_o$ when the material with the refractive index from 2.2 to 2.4 is used, respectively.

The respective layers can be formed in accordance with film forming technique such as vacuum deposition, sputtering, ion plating, etc. In this case, the various film compositions and film thicknesses can be designed by setting the film forming conditions appropriately.

The formation of the multilayer polarizing light separating film 140 is not limited to only the above-mentioned example. That is, it is possible to repeatedly form only a plurality of lamination layers 150 on the first layer 110, without forming the "a" to "d" layers 140a to 140d. Further, the number of formations of the lamination layers 150 is about 1 to 10 times, preferably from 2 to 8 times, and more preferably from 3 to 6 times.

Further, the angle of incidence upon the multilayer polarizing light separating film 140 was 45° in the above-mentioned example. However, without being limited thereto, the similar effects can be obtained when the angle of incidence ranges from 44.7° to 45.3°.

As described above, in the beam splitter, according to the present invention, it is possible to extremely increase the reflectance of the P polarized component of reflected light in comparison with the S polarized component of the reflected light. More practically, the reflectance of the P polarized component of the reflected light can be increased to about 80% or more, particular up to 95%. Accordingly, it is possible to design an optical system on the basis of only the P polarized component of the reflected light, thus resulting in increasing the design flexibility of the optical system.

Practical examples of the polarizing light beam splitter according to this embodiment will be described hereinbelow.

[EXAMPLE 10]

(1) Manufacturing of Beam Splitter

After the sloping surface of a rectangular prism (incoming prism) (SFS1, refractive index: 1.86) had been washed precisely, an optical multilayer thin film according to the present invention was formed thereon by forming the first to twenty-ninth layers of materials as listed in Table 20 in sequence, beginning from the surface of the sloping surface of the rectangular prism, in accordance with vacuum deposition techniques. Further, a bonding layer was formed on the twenty-ninth layer. Thereafter, the rectangular prism was bonded to another rectangular prism (outgoing prism) (BK7, refractive index: 1.511) to constitute a polarizing light beam splitter. Further, in Table 20, the refractive indices (at the measuring wavelength: 780 nm) of the respective layers and the optical thicknesses thereof are both listed.

TABLE 20

| | ($\lambda_o$ = 780 nm  $\theta$ = 45°) | | |
|---|---|---|---|
| LAYER | MATL | INDEX | OPT THK |
| INCOME MED | SFS1 | 1.896 | — |
| 1st LAYER | $ZrO_2$ | 2.000 | 0.336 $\lambda_o$ |
| 2nd LAYER | $Al_2O_3$ | 1.633 | 0.438 $\lambda_o$ |
| 3rd LAYER | $MgF_2$ | 1.377 | 1.098 $\lambda_o$ |
| 4th LAYER | $SiO_2$ | 1.465 | 0.620 $\lambda_o$ |
| 5th LAYER | $TiO_2$ | 2.258 | 0.311 $\lambda_o$ |
| 6th LAYER | $Al_2O_3$ | 1.633 | 0.438 $\lambda_o$ |
| 7th LAYER | $MgF_2$ | 1.377 | 1.098 $\lambda_o$ |
| 8th LAYER | $SiO_2$ | 1.465 | 0.620 $\lambda_o$ |
| 9th LAYER | $TiO_2$ | 2.258 | 0.311 $\lambda_o$ |
| 10th LAYER | $Al_2O_3$ | 1.633 | 0.438 $\lambda_o$ |
| 11th LAYER | $MgF_2$ | 1.377 | 1.098 $\lambda_o$ |
| 12th LAYER | $SiO_2$ | 1.465 | 0.620 $\lambda_o$ |
| 13th LAYER | $TiO_2$ | 2.258 | 0.311 $\lambda_o$ |
| 14th LAYER | $Al_2O_3$ | 1.633 | 0.438 $\lambda_o$ |
| 15th LAYER | $MgF_2$ | 1.377 | 1.098 $\lambda_o$ |
| 16th LAYER | $SiO_2$ | 1.465 | 0.620 $\lambda_o$ |
| 17th LAYER | $TiO_2$ | 2.258 | 0.311 $\lambda_o$ |
| 18th LAYER | $Al_2O_3$ | 1.633 | 0.438 $\lambda_o$ |
| 19th LAYER | $MgF_2$ | 1.377 | 1.098 $\lambda_o$ |
| 20th LAYER | $SiO_2$ | 1.465 | 0.620 $\lambda_o$ |
| 21st LAYER | $TiO_2$ | 2.258 | 0.311 $\lambda_o$ |
| 22nd LAYER | $Al_2O_3$ | 1.633 | 0.438 $\lambda_o$ |
| 23rd LAYER | $MgF_2$ | 1.377 | 1.098 $\lambda_o$ |
| 24th LAYER | $SiO_2$ | 1.465 | 0.620 $\lambda_o$ |
| 25th LAYER | $TiO_2$ | 2.258 | 0.311 $\lambda_o$ |
| 26th LAYER | $Al_2O_3$ | 1.633 | 0.438 $\lambda_o$ |
| 27th LAYER | $MgF_2$ | 1.377 | 1.098 $\lambda_o$ |
| 28th LAYER | $SiO_2$ | 1.465 | 0.620 $\lambda_o$ |
| 29th LAYER | $Al_2O_3$ | 1.633 | 0.438 $\lambda_o$ |
| OUTGO MED | BK7 | 1.511 | — |

(2) Measurement of Spectral Characteristics

Figure 14:
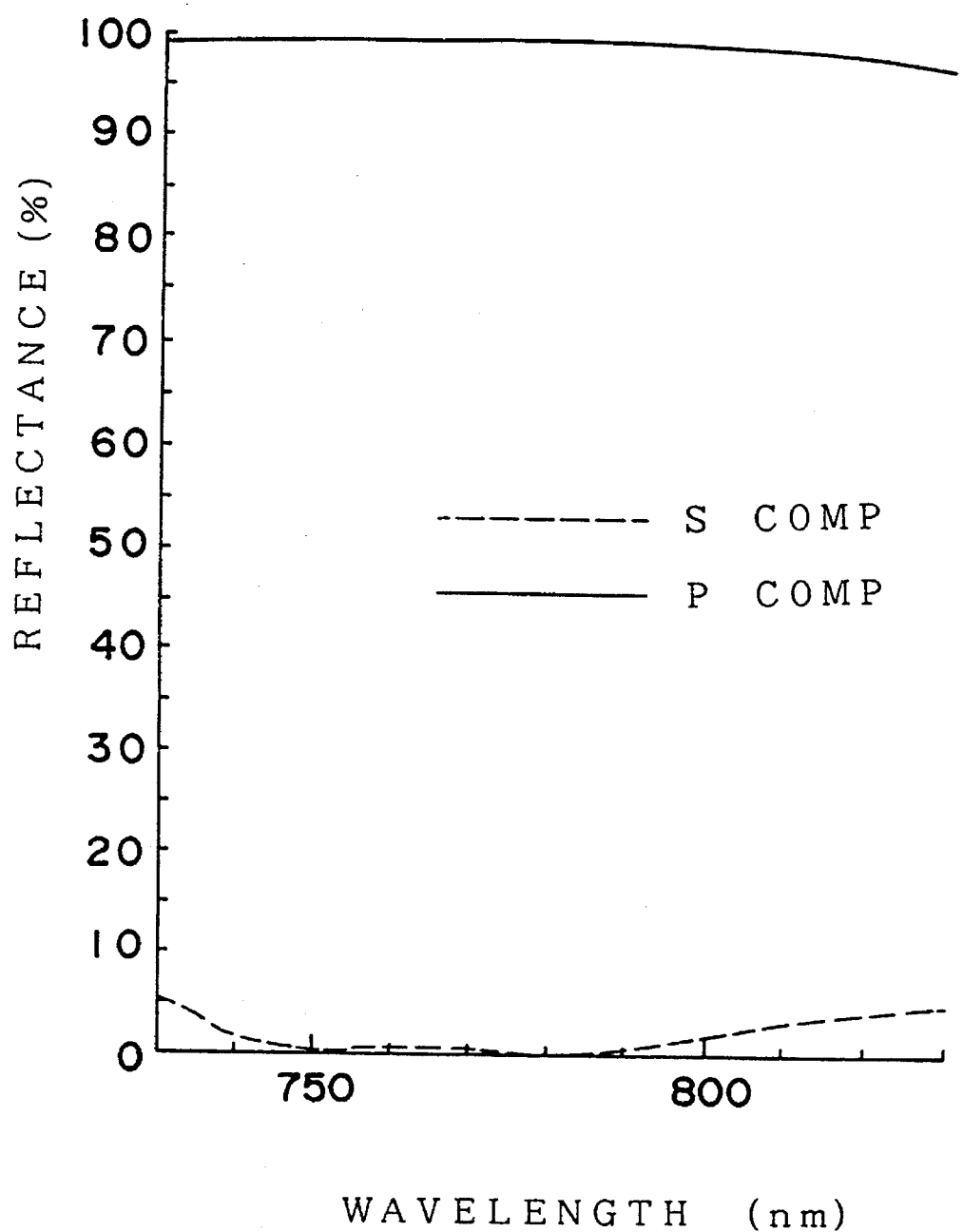
FIG. 14 is a graph showing the spectral characteristics of a tenth example of the present invention.

A light beam with wavelengths from 730 to 830 nm (designed wavelength: 780 nm) was allowed to be incident upon the optical multilayer thin film formed on the sloping surface of the above-mentioned polarizing light beam splitter at the angle of incidence 45°. The reflectances of the S and P polarized components of the reflected light were measured. FIG. 14 is a graph which shows the measured results. The graph indicates that the reflectance (%) of the S polarized component of the reflected light is equal to or less than 6% in a range between ±50 nm of the designed wavelength, and equal to or less than 3% in a range between ±30 nm of the designed wavelength. Further, the graph indicates that the reflectance (%) of the P polarized component of the reflected light is equal to or greater than 97% in a range between ±50 nm of the designed wavelength, and equal to or greater than 99% in a range between ±30 nm of the designed wavelength. That is, the graph indicates that the polarizing beam splitter provides excellent polarized light separating characteristics.

[EXAMPLE 11]

(1) Manufacturing of Beam Splitter

After the sloping surface of a rectangular prism (incoming prism) (SFS1, refractive index: 1.86) had been washed precisely, an optical multilayer thin film according to the present invention, was formed thereon by forming the first to twenty-ninth layers of materials as listed in Table 21 in sequence, beginning from the surface of the sloping surface of the rectangular prism, in accordance with vacuum deposition technique. Further, a bonding layer was formed on the twenty-ninth layer. The rectangular prism was bonded to another rectangular prism (outgoing prism) (BK7, refractive index: 1.511) to constitue a polarizing light beam splitter. Further, in Table 21, the refractive indices (at the measuring wavelength: 780 nm) of the respective layers and the optical thicknesses thereof are both listed.

TABLE 21

| | ($\lambda_o$ = 830 nm  $\theta$ = 45°) | | |
|---|---|---|---|
| LAYER | MATL | INDEX | OPT THK |
| INCOME MED | SFS1 | 1.892 | — |
| 1st LAYER | $ZrO_2$ | 2.000 | 0.336 $\lambda_o$ |
| 2nd LAYER | $Al_2O_3$ | 1.633 | 0.438 $\lambda_o$ |
| 3rd LAYER | $MgF_2$ | 1.377 | 1.098 $\lambda_o$ |
| 4th LAYER | $SiO_2$ | 1.462 | 0.620 $\lambda_o$ |
| 5th LAYER | $TiO_2$ | 2.251 | 0.311 $\lambda_o$ |
| 6th LAYER | $Al_2O_3$ | 1.633 | 0.438 $\lambda_o$ |
| 7th LAYER | $MgF_2$ | 1.377 | 1.098 $\lambda_o$ |
| 8th LAYER | $SiO_2$ | 1.462 | 0.620 $\lambda_o$ |
| 9th LAYER | $TiO_2$ | 2.251 | 0.311 $\lambda_o$ |
| 10th LAYER | $Al_2O_3$ | 1.633 | 0.438 $\lambda_o$ |
| 11th LAYER | $MgF_2$ | 1.377 | 1.098 $\lambda_o$ |
| 12th LAYER | $SiO_2$ | 1.462 | 0.620 $\lambda_o$ |
| 13th LAYER | $TiO_2$ | 2.251 | 0.311 $\lambda_o$ |
| 14th LAYER | $Al_2O_3$ | 1.633 | 0.438 $\lambda_o$ |
| 15th LAYER | $MgF_2$ | 1.377 | 1.098 $\lambda_o$ |
| 16th LAYER | $SiO_2$ | 1.462 | 0.620 $\lambda_o$ |
| 17th LAYER | $TiO_2$ | 2.251 | 0.311 $\lambda_o$ |
| 18th LAYER | $Al_2O_3$ | 1.633 | 0.438 $\lambda_o$ |
| 19th LAYER | $MgF_2$ | 1.377 | 1.098 $\lambda_o$ |
| 20th LAYER | $SiO_2$ | 1.462 | 0.620 $\lambda_o$ |
| 21st LAYER | $TiO_2$ | 2.251 | 0.311 $\lambda_o$ |
| 22nd LAYER | $Al_2O_3$ | 1.633 | 0.438 $\lambda_o$ |
| 23rd LAYER | $MgF_2$ | 1.377 | 1.098 $\lambda_o$ |
| 24th LAYER | $SiO_2$ | 1.462 | 0.620 $\lambda_o$ |
| 25th LAYER | $TiO_2$ | 2.251 | 0.311 $\lambda_o$ |
| 26th LAYER | $Al_2O_3$ | 1.633 | 0.438 $\lambda_o$ |
| 27th LAYER | $MgF_2$ | 1.377 | 1.098 $\lambda_o$ |
| 28th LAYER | $SiO_2$ | 1.462 | 0.620 $\lambda_o$ |
| 29th LAYER | $Al_2O_3$ | 1.633 | 0.438 $\lambda_o$ |
| OUTGO MED | BK7 | 1.510 | — |

(2) Measurement of Spectral Characteristics

Figure 15:
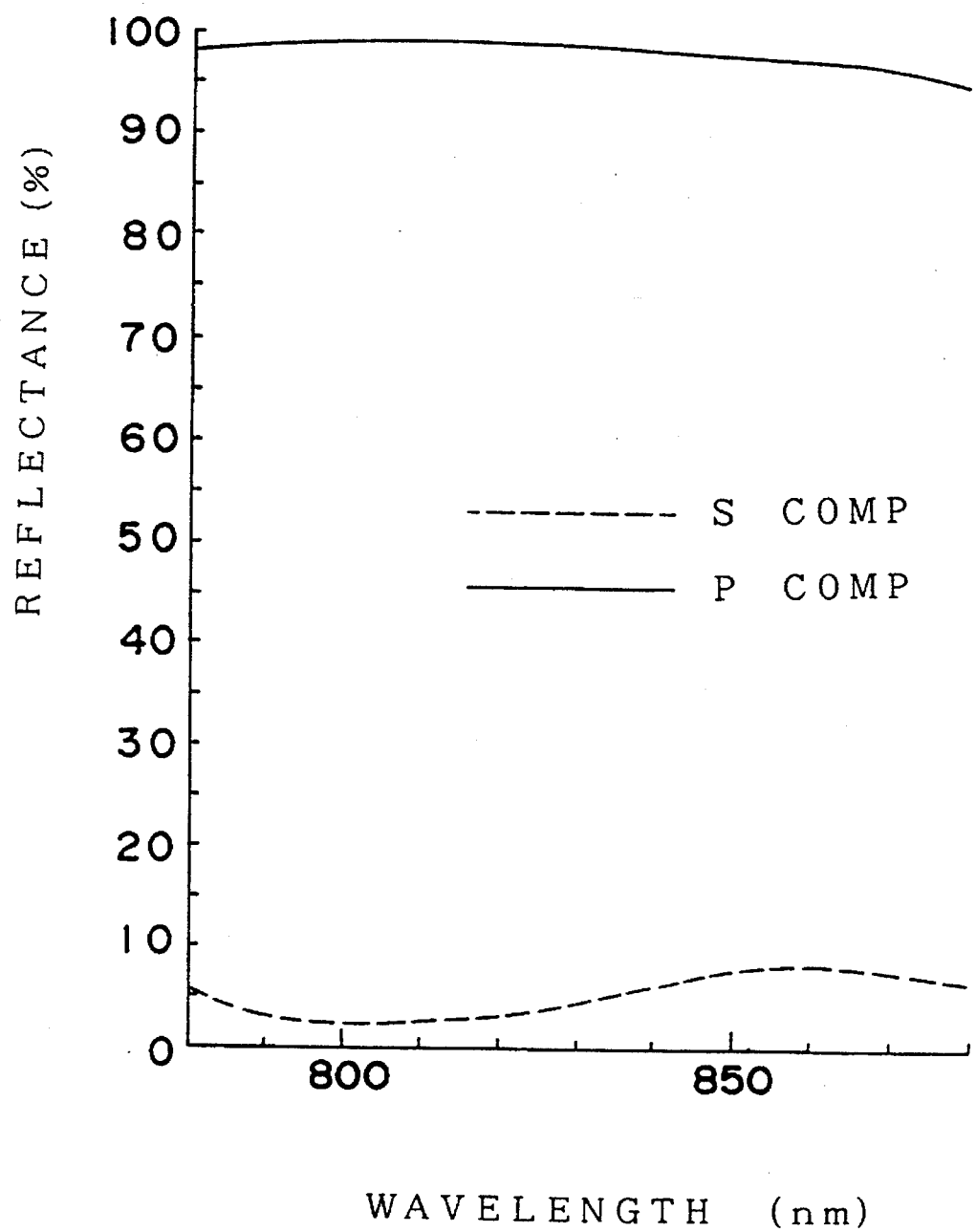
FIG. 15 is a graph showing the spectral characteristics of an eleventh example of the present invention.

A light beam with wavelengths from 780 to 880 nm (designed wavelength: 830 nm) was allowed to be incident upon the optical multilayer thin film formed on the sloping surface of the above-mentioned polarizing light beam splitter at the angle of incidence 45°. The reflectances of the S and P polarized components of the reflected light were measured. FIG. 15 is a graph which shows the measured results. The graph indicates that the reflectance (%) of the S polarized component of the reflected light is equal to or less than 9% in a range between ±50 nm of the designed wavelength, and equal to or less than 8% in a range between ±20 nm of the designed wavelength. Further, the graph indicates that the reflectance (%) of the P polarized component of the reflected light is equal to or greater than 96% in a range between ±50 nm of the designed wavelength, and equal to or greater than 98% in a range between ±20 nm of the designed wavelength. That is, the graph indicates that the polarizing beam splitter provides excellent polarized light separating characteristics.

[EXAMPLE 12]

(1) Manufacturing of Beam Splitter

The first layer was formed in accordance with the manufacturing method which is the same as the case of the Examples 10 and 11, and four lamination layers 150 were stacked repeatedly on the first layer. Table 22 lists the refractive indices (at the measuring wavelength: 780 nm) of the respective layers and the optical thicknesses thereof together.

TABLE 22

| | ($\lambda_o$ = 830 nm $\theta$ = 45°) | | |
|---|---|---|---|
| LAYER | MATL | INDEX | OPT THK |
| INCOME MED | SFS1 | 1.892 | — |
| 1st LAYER | $ZrO_2$ | 2.000 | 0.336 $\lambda_o$ |
| 2nd LAYER | $Al_2O_3$ | 1.633 | 0.436 $\lambda_o$ |
| 3rd LAYER | $MgF_2$ | 1.377 | 1.059 $\lambda_o$ |
| 4th LAYER | $SiO_2$ | 1.462 | 0.620 $\lambda_o$ |
| 5th LAYER | $TiO_2$ | 2.251 | 0.311 $\lambda_o$ |
| 6th LAYER | $Al_2O_3$ | 1.633 | 0.436 $\lambda_o$ |
| 7th LAYER | $MgF_2$ | 1.377 | 1.059 $\lambda_o$ |
| 8th LAYER | $SiO_2$ | 1.462 | 0.620 $\lambda_o$ |
| 9th LAYER | $TiO_2$ | 2.251 | 0.311 $\lambda_o$ |
| 10th LAYER | $Al_2O_3$ | 1.633 | 0.436 $\lambda_o$ |
| 11th LAYER | $MgF_2$ | 1.377 | 1.059 $\lambda_o$ |
| 12th LAYER | $SiO_2$ | 1.462 | 0.620 $\lambda_o$ |
| 13th LAYER | $TiO_2$ | 2.251 | 0.311 $\lambda_o$ |
| 14th LAYER | $Al_2O_3$ | 1.633 | 0.436 $\lambda_o$ |
| 15th LAYER | $MgF_2$ | 1.377 | 1.059 $\lambda_o$ |
| 16th LAYER | $SiO_2$ | 1.462 | 0.620 $\lambda_o$ |
| 17th LAYER | $TiO_2$ | 2.251 | 0.311 $\lambda_o$ |
| OUTGO MED | BK7 | 1.510 | — |

(2) Measurement of Spectral Characteristics

Figure 16:
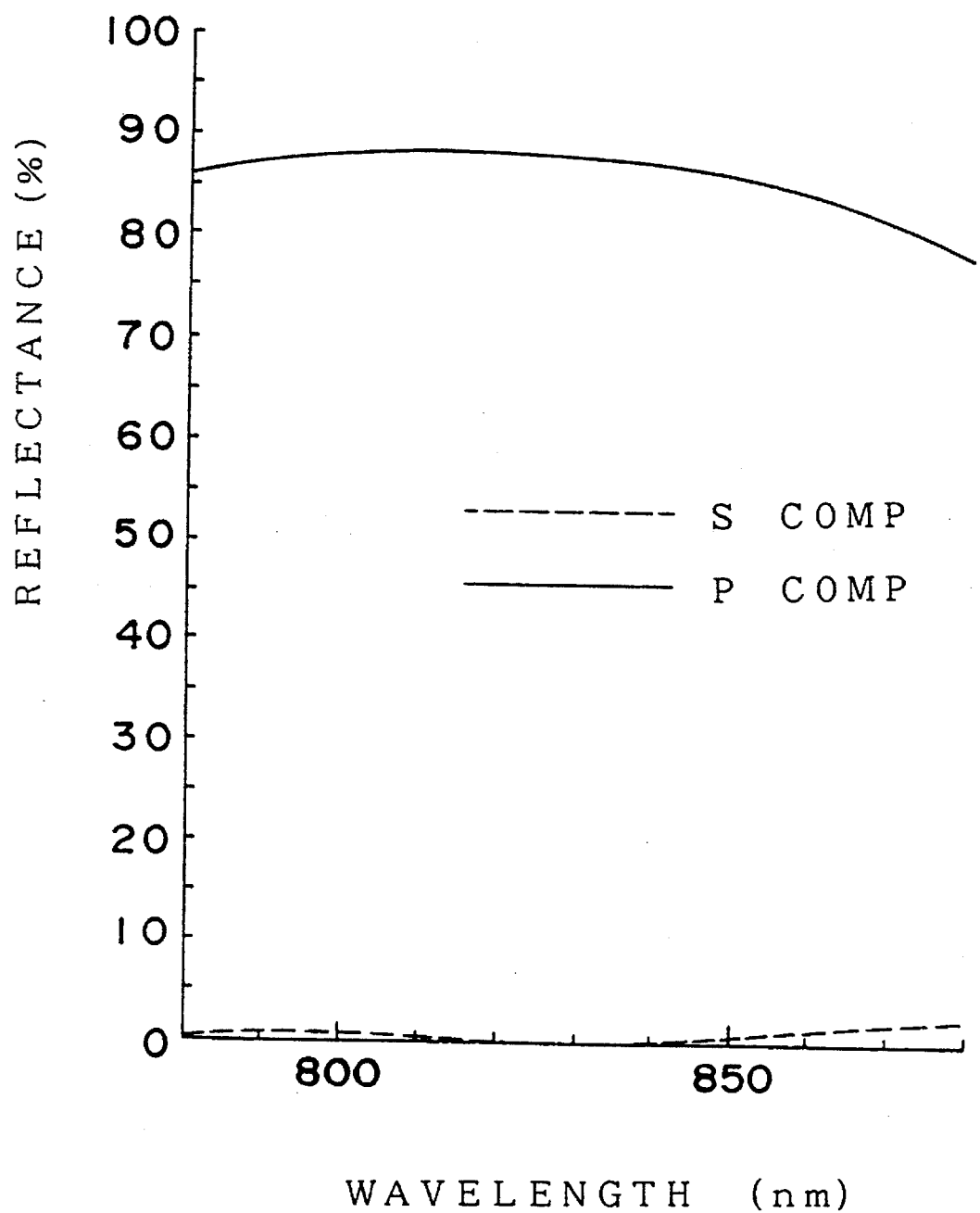
FIG. 16 is a graph showing the spectral characteristics of a twelfth example of the present invention.

A light beam with wavelengths from 780 to 880 nm (designed wavelength: 830 nm) was allowed to be incident upon the optical multilayer thin film formed on the sloping surface of the above-mentioned polarizing light beam splitter at the angle of incidence 45°. The reflectances of the S and P polarized components of the reflected light were measured. FIG. 16 is graph which shows the measured results. The graph indicates that the reflectance (%) of the S polarized component of the reflected light is equal to or less than 2% in a range between ±50 nm of the designed wavelength, and equal to or less than 0.8% in a range between ±20 nm of the designed wavelength. Further, the graph indicates that the reflectance (%) of the P polarized component of the reflected light is equal to or greater than 80% in a range between ±50 nm of the designed wavelength, and equal to or greater than 87% in a range between ±20 nm of the designed wavelength. In this example, the reflectance of the S polarized component of the reflected light is low. Therefore, this example is suitable when only the S polarized component thereof is required to be reduced, although the P polarized component thereof decreases slightly.

As described above, it is also possible to adjust the reflectances of both the P and S polarized components of reflected light by adjusting the number of repeatedly stacked lamination layers 150. In more practical terms, when the lamination layer 150 is increased by one unit, it is possible to increase the reflectance of the P polarized component of reflected light by 10 to 20%.

Finally, it should be noted that the present disclosure relates to subject matter contained in Japanese Patent Applications No. 4-68985 and No. 4-68986 both filed on Feb. 18, 1992 which are expressly incorporated herein by reference in their entireties.

Further, it should also be noted that the present invention is not limited to the embodiments as described above. Rather, the scope of the invention is determined by the fllowing claims.

What is claimed is:

1. A beam splitter, comprising:
   a first prism having a predetermined refractive index;
   a second prism having a predetermined refractive index; and
   a multilayer polarizing light separating film interposed between said first and second prisms, said multilayer polarizing light separating film comprising a first layer having a predetermined refractive index and formed on said incoming side prism, and a plurality of lamination layers each composed of at least four sublayers each having different refractive indices, wherein each of the refractive indices is determined such that reflectance of a P polarized component of reflected light becomes equal to or greater than 80% when light is incident upon said film with an angle of incidence more than a predetermined angle.

2. The beam splitter as claimed in claim 1, further comprising a, b, c, and d layers formed in sequence beginning from the side of said lamination layers and provided between said lamination layers and said second prism, each of said a, b, c and d layers having a predetermined refractive index.

3. The beam splitter as claimed in claim 2, wherein the refractive index of said first prism is from 1.89 to 1.91, the refractive index of the second prism is from 1.50 to 1.55, the refractive index of said first layer is from 2.0 to 2.1, refractive indices of said lamination layers are from 1.63 to 1.68 in the first sublayer beginning from said first layer, from 1.37 to 1.38 in the second sublayer, from 1.44 to 1.48 in the third sublayer, and from 2.2 to 2.4 in the fourth sublayer, respectively, the refractive indices of said a and d layers are from 1.63 to 1.68, the refractive index of said b layer is from 1.37 to 1.38, and the refractive index of said c layer is from 1.44 to 1.48, respectively.

4. A beam splitter, comprising:
   an incoming side prism;
   an outgoing side prism; and
   a multilayer polarizing light separating film interposed between said incoming and outgoing side prisms, wherein said multilayer polarizing light separating film comprises: a first layer formed on said incoming side prism; at least one lamination layer composed of at least four sublayers; and a, b, c, and d layers formed in sequence beginning from a side of said lamination layer and provided between said lamination layer and said outgoing side prism; and wherein a refractive index of said incoming side prism is from 1.89 to 1.91, a refractive index of said outgoing side prism is from 1.50 to 1.55, a refractive index of said first layer is from 2.0 to 2.1, refractive indices of said lamination layers are from 1.63 to 1.68 in said first sublayer beginning from said first layer, from 1.37 to 1.38 in said second sublayer, from 1.44 to 1.48 in said third sublayer, and from 2.2 to 2.4 in said fourth sublayer, respectively, refractive indices of said a and d layers are from 1.63 to 1.68, a refractive index of said b layer is from 1.37 to 1.38, and a refractive index of said c layer is from 1.44 to 1.48, respectively.

5. The beam splitter as claimed in claim 4, wherein each of said first layer, said lamination layer, and said a, b, c and d layers do not substantially absorb light.

6. The beam splitter of claim 4, wherein each of said incoming and outgoing side prisms do not substantially absorb light.

7. The beam splitter of claim 4, wherein reflectance of P polarized component of reflected light is at least 80%.

8. The beam splitter of claim 4, wherein reflectance of P polarized component of reflected light is at least 95%.

* * * * *

UNITED STATES PATENT AND TRADEMARK OFFICE
CERTIFICATE OF CORRECTION

PATENT NO. : 5,579,159
DATED : November 26, 1996
INVENTOR(S) : Taku ITO

It is certified that error appears in the above-indentified patent and that said Letters Patent is hereby corrected as shown below:

On the cover, in section [56], "References Cited", "U.S. PATENT DOCUMENTS", line 15, change "359" to ---369---.

At column 26, line 39 (claim 1, line 14), change "equal to or greater than" to ---at least---.

Signed and Sealed this

Twenty-second Day of April, 1997

*Attest:*

BRUCE LEHMAN

*Commissioner of Patents and Trademarks*

*Attesting Officer*